United States Patent
Kato

(10) Patent No.: US 7,916,332 B2
(45) Date of Patent: Mar. 29, 2011

(54) DOCUMENT PROCESSING APPARATUS AND A METHOD FOR CONTROLLING A DOCUMENT PROCESSING APPARATUS

(75) Inventor: Hisashi Kato, Yokohama (JP)

(73) Assignee: Canon Kabushiki Kaisha (JP)

( * ) Notice: Subject to any disclaimer, the term of this patent is extended or adjusted under 35 U.S.C. 154(b) by 915 days.

(21) Appl. No.: 11/782,941

(22) Filed: Jul. 25, 2007

(65) Prior Publication Data
US 2008/0024802 A1    Jan. 31, 2008

(30) Foreign Application Priority Data

Jul. 31, 2006 (JP) ................. 2006-208933

(51) Int. Cl.
G06F 15/00 (2006.01)
G06F 15/16 (2006.01)

(52) U.S. Cl. ..................... 358/1.15; 709/201

(58) Field of Classification Search ............. 358/1.15, 358/1.19, 1.1, 1.13, 1.14, 1.16, 1.18, 402, 358/403, 442, 400, 1.9; 709/201, 228, 204, 709/206; 726/27; 715/234, 239, 229, 208, 715/255, 205; 713/166, 167, 2
See application file for complete search history.

(56) References Cited

U.S. PATENT DOCUMENTS

| | | | |
|---|---|---|---|
| 2002/0065807 A1 | 5/2002 | Kawamoto et al. | |
| 2004/0046797 A1 | 3/2004 | Perry | |
| 2004/0111675 A1 | 6/2004 | Mori et al. | |
| 2006/0167953 A1 | 7/2006 | Kawamoto et al. | |
| 2009/0178144 A1* | 7/2009 | Redlich et al. | 726/27 |

FOREIGN PATENT DOCUMENTS

| | | |
|---|---|---|
| EP | 1 195 266 A2 | 4/2002 |
| EP | 1 211 594 A2 | 6/2002 |
| JP | 11-180011 A | 7/1999 |
| JP | 2004-110638 | 4/2004 |
| JP | 2004-192248 A | 7/2004 |
| JP | 2005-149212 A | 6/2005 |
| JP | 2005-250606 | 9/2005 |

OTHER PUBLICATIONS

Extended European Search Report issued in corresponding European Patent Application No. 07113371.4 dated Apr. 8, 2010.
Chinese Office Action dated May 8, 2009, issued in corresponding Chinese Application No. 2007101382592.
Office action issued in corresponding Japanese patent application No. 2006-208933, dated Aug. 18, 2008.

* cited by examiner

*Primary Examiner* — Saeid Ebrahimi Dehkordy
(74) *Attorney, Agent, or Firm* — Rossi, Kimms & McDowell LLP

(57) ABSTRACT

The present invention enables page-level or document-level print setup of an XPS document via a user interface. The print ticket of a page of interest is obtained by merging a job-level print ticket 1804, to which the page of interest belongs, a document-level print ticket 1805, to which the page of interest belongs, and a page-level print ticket 1806 of the page of interest. The obtained individual page print tickets are compared with the job-level print ticket and if there are differences, it is determined that this particular page has exception settings and the exception settings are saved and displayed.

12 Claims, 23 Drawing Sheets

CONFLICT INFORMATION — 1302

| DOCUMENT | PAGES | SETTING CONTENTS | PRIOR TO MODIFICATION | AFTER MODIFICATION |
|---|---|---|---|---|
| 1 | 1 | PAPER SIZE | A3 | A4 |
| 2 | 4 | PAPER SIZE | 11×17 | A4 |
| | | | | |
| | | | | |
| | | | | |

1303 — PAGES
1301
1304 — SETTING CONTENTS
1305 — PRIOR TO MODIFICATION
1306 — AFTER MODIFICATION

OK — 1307
CANCEL — 1308

FIG. 14

EXAMPLE OF EXCEPTION SETUP INFORMATION:

```
<ExceptionData>
    <FD number="1">                          ← EXCEPTION SETUP INFORMATION TAG
                                             ← DOCUMENT NUMBER TAG
        <ExceptionPages id="1">              ← PAGE EXCEPTION SETUP INFORMATION TAG
            <PageStart>2</PageStart>         ← EXCEPTION START PAGE NUMBER TAG
            <PageEnd>3</PageEnd>             ← EXCEPTION END PAGE NUMBER TAG
            <ExceptionSetting Feature="PageColor">Color</ExceptionSetting>  ← EXCEPTION SETTING CONTENT TAG
            <ExceptionSetting Feature="PageInputBins">Drawer1</ExceptionSetting>
        </ExceptionPages>
        <ExceptionPages id="2">
            <PageStart>4</PageStart>
            <PageEnd>4</PageEnd>
            <ExceptionSetting Feature="PageMediaSize">A5</ExceptionSetting>
        </ExceptionPages>
    </FD>
    <FD number="2">
        <ExceptionPages id="3">
            <PageStart>2</PageStart>
            <PageEnd>3</PageEnd>
            <ExceptionSetting Feature="PageMediaSize">A5</ExceptionSetting>
            <ExceptionSetting Feature="PageColor">Color</ExceptionSetting>
        </ExceptionPages>
    </FD>
</ExceptionData>
```

FIG. 15

EXAMPLE OF SETTING RECONCILIATION INFORMATION:

```
<Conflictinfo>  ——  CONFLICT INFORMATION TAG
    <FD number="1">  ——  DOCUMENT NUMBER TAG
        <ConflictedPages>  ——  CONFLICTING PAGE INFORMATION TAG
            <PageEnd>4</PageStart>  ——  START PAGE NUMBER TAG
            <PageEnd>4</PageEnd>  ——  END PAGE NUMBER TAG
            <Feature name="PageMediaSize ">  ——  SETUP FEATURE TAG
                <PreCharged>A3</PreCharged>  ——  PRE-MODIFICATION SETUP TAG
                <PostChanged>A4</PostChanged>  ——  POST-MODIFICATION SETUP TAG
            </Feature>
        </ConflictedPages >
    </FD>
    <FD number="2">
        <ConflictedPages >
            <PageEnd>4</PageStart>
            <PageEnd>4</PageEnd>
            <Feature name ="PageMediaSize ">
                <PreCharged>11 x 17</PreCharged>
                <PostChanged>A4</PostChanged>
            </Feature>
        </ConflictedPages >
    </FD>
</Conflictinfo>
```

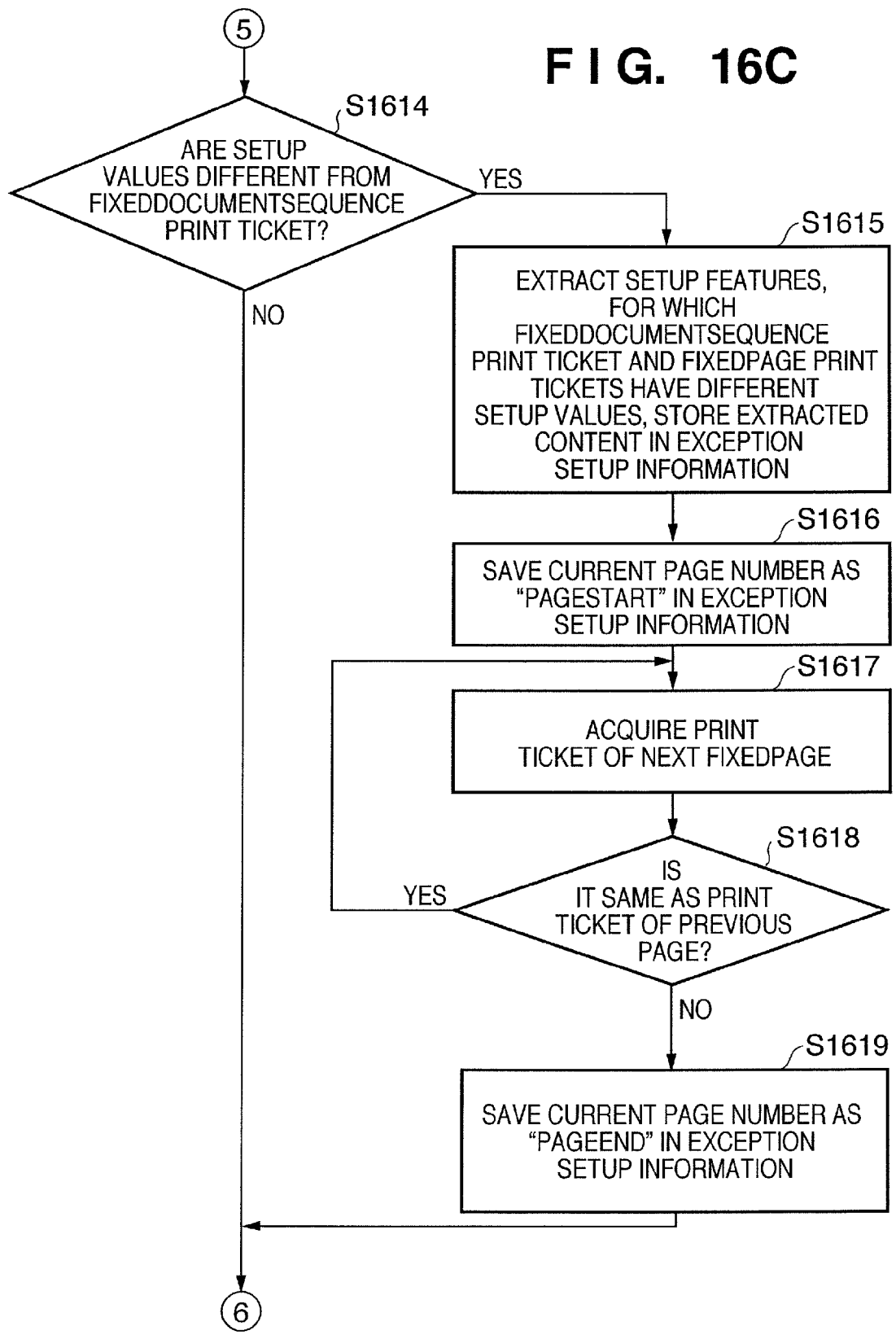

DOCUMENT PROCESSING APPARATUS AND A METHOD FOR CONTROLLING A DOCUMENT PROCESSING APPARATUS

BACKGROUND OF THE INVENTION

1. Field of the Invention

The present invention relates to a document processing apparatus and a method for controlling a document processing apparatus for processing documents with print settings.

2. Description of the Related Art

According to publicly announced plans, XPS (XML Paper Specification), an XML-based document format, will be supported in Windows Vista™, a product of Microsoft Corporation ("XML Paper Specification Version 0.9", May 18, 2006, Microsoft Corporation [search results as of Jul. 25, 2006], <URL:http://www.microsoft.com/whdc/xps/xpsspecd-wn.mspx(XPS_09. doc)> (called "XML Paper Specification")). An XPS document is a document composed of three hierarchical levels called FixedDocumentSequence/FixedDocument/FixedPage, as shown in FIG. 18. FixedDocumentSequence, FixedDocument, and FixedPage correspond to nodes in the respective hierarchical levels, with the XPS document having a tree structure made up of these nodes. FixedDocumentSequence describes a FixedDocument sequence. FixedDocument describes a sequence of FixedPages. FixedPage comprises page contents. XML documents containing print attributes, called print tickets, can be associated with the nodes of the respective hierarchical levels ("Print Ticket and Print Capabilities Support in Windows Print Drivers", Feb. 6, 2006, Microsoft Corporation [search results as of Jul. 25, 2006]<URL: http://www.microsoft.com/whdc/device/print/XPSDrv_Print Ticket.mspx (XPS-Drv_PrintTicket.doc)>(called "Print Ticket")). It should be noted that print attributes are sometimes referred to as print settings. As shown in the example illustrated in FIG. 18, a job-level print ticket 1804 is associated with FixedDocumentSequence. In addition, a document-level print ticket 1805 is associated with FixedDocument1. Moreover, a page-level print ticket 1806 is associated with FixedPage1. The ability to specify print tickets for each node of each hierarchical level makes it possible to change the output paper size for each FixedPage of an XPS document, as well as change the way each FixedDocument is stapled. It should be noted that a job-level print ticket is a print ticket associated with FixedDocumentSequence. A document-level print ticket is a print ticket associated with a FixedDocument. A page-level print ticket is a print ticket associated with a FixedPage.

As mentioned in "XML Paper Specification", one aspect of such an XPS document is that it can double up as a print spooler format during printing, and another is that it can be used as an ordinary document. Regarding the document aspect, an XPS document, in the same manner as an Adobe PDF file, can be used as a document format for the purpose of public disclosure and dissemination of various documents. As described above, in an XPS document, each node of the hierarchical levels can hold a print ticket, and, as a result, by virtue of the fact that the print tickets contain print settings, it is possible to create and distribute XPS documents associated with print settings.

In addition, in the so-called print-on-demand (POD) market, which involves printing on an "as-required" basis, as well as in the field of high-end business printer drivers and hot folders, it is desirable to specify print attribute settings for each page in addition to print attribute settings for the job as a whole. For instance, in certain cases, when creating a document made up of multiple sections, it may be desirable to use colored paper for the first pages of the sections and white paper for the rest of the pages. In such cases, the entire job is configured to use white paper and only the first pages of each section have a print attribute setting that specifies colored paper, that is, different from the print attribute settings for the job as a whole. In other cases, it might be preferable for the configuration of other settings, for example, paper size, simplex/duplex, post-print finishing, color settings, etc. for a specific page or range of pages to be different from the print attribute settings of the job as a whole. It should be noted that, as used in the present embodiment, the term "hot folder" refers to a folder associated with print settings. Because print settings associated with a hot folder are provided in document files saved in the hot folder, there is no need to reconfigure print settings for documents saved in the hot folder.

When different print attribute settings are configured for each page in such a printer driver or hot folder, a property panel or a dialog used to configure page exceptions is opened in order to specify a page or a page range and create a partition. In many cases print attributes can be further configured for the partition through a lower-level dialog (see Japanese Patent Laid-Open No. 2004-110638 or Japanese Patent Laid-Open No. 2005-250606).

According to Japanese Patent Laid-Open No. 2004-110638, a functional module for section-level setup is provided in a printer driver in order to permit different print attribute settings for different sections by saving them as section setup information files. Moreover, Japanese Patent Laid-Open No. 2005-250606 proposes a method for advance determination of exception print conditions that constitute exceptions to the basic setup conditions. For instance, let us suppose that the exception setup condition is A3 paper size, the print condition is "one-up" printing, and the basic setup conditions are A4 and "two-up". If the document to be printed is made up of 5 pages consecutively sized A4, A4, A3, A4, and A4, then the first and second pages are A4-sized and therefore match the basic setup conditions. For this reason, these two pages are printed two-up. In addition, the third page is A3-sized and corresponds to the exception setup condition. For this reason, the third page is printed one-up. The fourth and fifth pages match the basic setup conditions, too, and are printed two-up. It should be noted that the expression "n-up" refers to a print setting used when printing n pages of a target document on one side of a sheet using reduced scale layout. N-up printing is sometimes called "reduced scale layout".

Furthermore, the method adopted in postscript printer drivers from Xerox Corporation and in postscript printer drivers from Heidelberger Druckmaschinen AG requires that the user, first of all, configure exception settings for pages or page ranges and create partitions. Next, exception settings are configured for the partitions using other print attribute setup panels or dialogs.

In the above-described background technology, an XPS document with print attributes may be distributed by the author of the document among multiple users. In such a case, if the application used to create the XPS document is unavailable for the users who receive the XPS document, the users will display and print it using a simple viewer or the like distributed free of charge, which will allow them to read and print the XPS document. Such a simple viewer has limited functionality and it is believed that in many cases it will not support displaying and modifying print attributes for each page contained in the hierarchical structure of the XPS document. Checking and modifying print attributes for each page on screen is not feasible when displaying a distributed XPS document using such a simple viewer. For instance, even though the author of the XPS document may use a large output paper size for a particular page, all the paper sizes in the XPS document will appear identical in the simple viewer. The reason for this is that document print attributes are given priority and, at the same time, the print attributes of pages, that is, a lower hierarchical level, cannot be understood when using such a simple viewer. However, when the document is printed, page print tickets are sent to the printer driver as well, which is why paper media of larger sizes will be used for specific pages for printing in accordance with the print settings of individual pages. Thus, the problem is that output obtained as a result of actual printing cannot be confirmed in the preview display window. Moreover, another problem is that it is impossible to confirm and modify print settings on a page-by-page basis.

Furthermore, in order to display and edit the print attributes of each node at each hierarchical level of an XPS document in the user interface window for exception setup, the program used to edit the XPS document needs to identify exception settings incorporated in the XPS document. For instance, the editing application will be able to identify exception settings by comparing the print attributes of each FixedPage contained in an XPS document. When there is a wide variety of setup features used for print attributes in an XPS document and, furthermore, when there are a large number of FixedPages in the document, comparing the print attributes of all the nodes will require a large amount of time. Therefore, the problem is that a lot of time will be necessary to display them on the user interface and no increase in operability or productivity will be achieved.

Moreover, because the editing application is launched by the user and the XPS file can be read, as described above, it is possible to display print settings in the UI on a page-by-page basis. However, the user interface of a conventional printer driver is called by the operating system in order to configure print settings and it cannot read an XPS file, which is managed by the application acting as the printing source. For this reason, a conventional printer driver cannot be aware of the print attributes set on a page-by-page basis and ends up displaying a print setup UI with default settings. Therefore, it is believed that the user will face the problem of being unaware of the fact that print attributes have been predefined on a page-by-page basis in the XPS document.

SUMMARY OF THE INVENTION

The present invention provides a document processing apparatus and a method for controlling a document processing apparatus, in which page exception settings assigned to a document (such as for example an XPS document) can be presented to the user prior to a print instruction by displaying them in the print setup user interface of the printer driver.

Furthermore, it provides a document processing apparatus and a method for controlling a document processing apparatus, wherein, as a result, the user can easily monitor print attributes for each page in the document with the help of the printer driver and, accordingly, can prevent unintended print output.

According to one aspect of the present invention, a document processing apparatus, in which document data having a tree structure made up of a plurality of hierarchical levels and allowing print attributes to be associated with nodes at each hierarchical level can be operated upon by a printer driver used to handle the print attributes, the apparatus comprises a document reading unit configured to read the document data in accordance with a read instruction;

an attribute reading unit configured to read print attributes associated with the nodes in the document data read by the document reading unit;

an extracting unit configured to extract an exception setting different from the print attributes associated with the whole document from among the print attributes read by the attribute reading unit; and a first displaying unit configured to display the exception setting extracted by the extracting unit in the user interface of the printer driver.

According to another aspect of the present invention, a document processing apparatus has a printer driver, the apparatus comprises a document reading unit configured to read document data in accordance with a read instruction entered through a user interface of the printer driver;

an attribute reading unit configured to read print attributes set the document data read by the document reading unit;

an extracting unit configured to extract an exception setting different from the print attributes associated with the whole document from among the print attributes read by the attribute reading unit; and a first displaying unit configured to display the exception setting extracted by the extracting unit in the user interface of the printer driver.

Because the present invention allows the user to easily monitor print attributes for each page in a document with the help of the printer driver, it can prevent unintended print output.

Further features of the present invention will become apparent from the following description of exemplary embodiments with reference to the attached drawings.

BRIEF DESCRIPTION OF THE DRAWINGS

FIG. 2 is a diagram illustrating a property window display used in a printer driver.

FIG. 13 is a diagram illustrating a conflict information display window.

FIG. 14 is a diagram illustrating an example of exception setup information.

FIG. 15 is a diagram illustrating an example of conflict information.

FIGS. 16A to 16D is a flow diagram illustrating the reading of print attributes in an XPS document.

DESCRIPTION OF THE EMBODIMENTS

[System Configuration]

Figure 1:
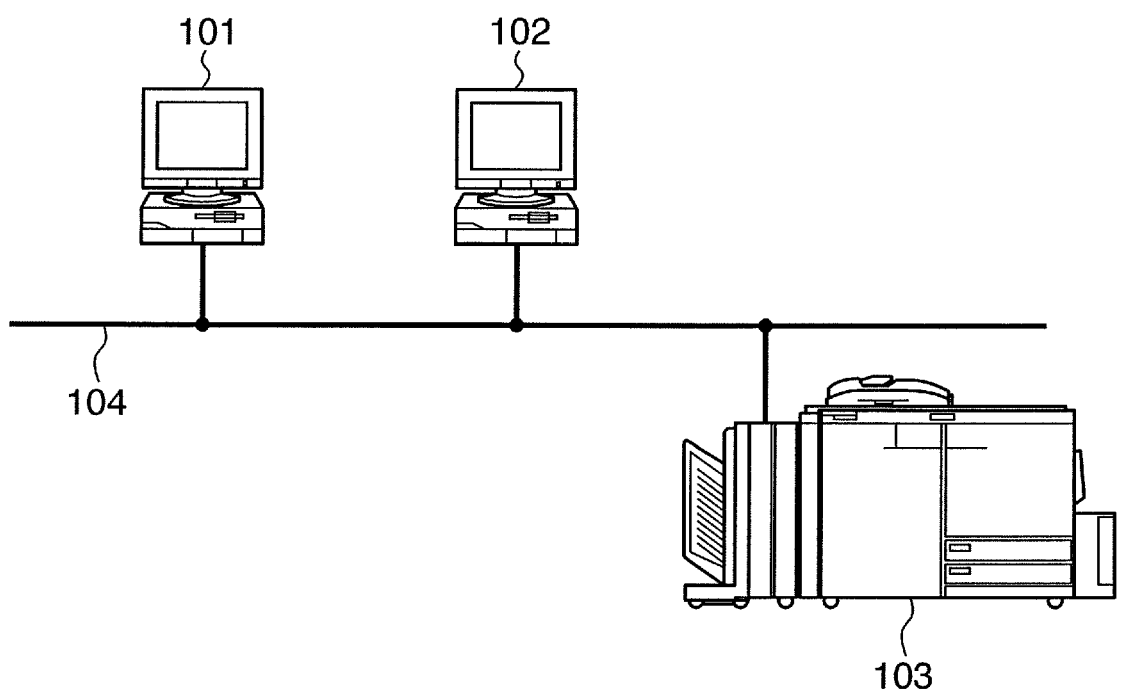
FIG. 1 is a block diagram of a printing system.

FIG. 1 is a system block diagram illustrating an exemplary configuration of a printing system used in the present invention. As shown in FIG. 1, this system comprises a client PC 101, a client PC 102, and a printer 103. These devices are enabled for communication through a network 104, which serves as a communications channel. Although FIG. 1 shows two devices to indicate that there are two or more client PCs on the network 104, only the client PC 101 is used in the explanations in the present embodiment because both devices have the same configuration.

Several applications used to create documents etc. and printer drivers used to output application data to the printer 103 are installed on the client PC 101. It should be noted that means other than printer drivers, for instance, hot folders and the like, can also be used when outputting the application data to the printer 103 if print attribute setup means are available.

The client PC 101 is a general-purpose personal computer. The client PC 101 has a RAM, which is used for storing software programs and data, a CPU, which executes the software programs and processes the data, and a file storage unit, such as a hard disk, which is used for saving the software programs and data as files. In addition, it is equipped with human interface devices such as a display, a keyboard, and a pointing device, as well as an NIC used for connecting to a network. Furthermore, an operating system (OS), which manages software resources and hardware resources, is installed on the client PC and is run by the CPU. In the present embodiment, the operating system is preferably one that supports XPS, e.g. Windows Vista™ from Microsoft Corporation.

[Outline of Printer Driver Operation]

FIG. 2 to FIG. 7 are schematic views illustrating exemplary printer driver windows including common page-level print attribute settings. It should be noted that all the operations and controls explained using FIG. 2 to FIG. 7 are part of the present invention.

The printer driver displays a GUI (graphical user interface) provided with a display window structure suitable for issuing instructions regarding print operations and other output operations to be performed by the printer 103 of this system. The GUI is made up of windows shown on the display screen when, for instance, the user issues an instruction to display printer-related properties. By operating the GUI, the user can configure the desired setup parameters of the print attributes (print attribute data). The printer driver exercises control such that the configured user print attribute settings are transmitted to a printer or another transmission destination (also called an output destination) along with the desired image data through a network or another communication medium. FIG. 2 to FIG. 7 show examples of the GUI with print attribute settings displayed by the printer driver.

<Print Setup Via GUI>

Figure 2:
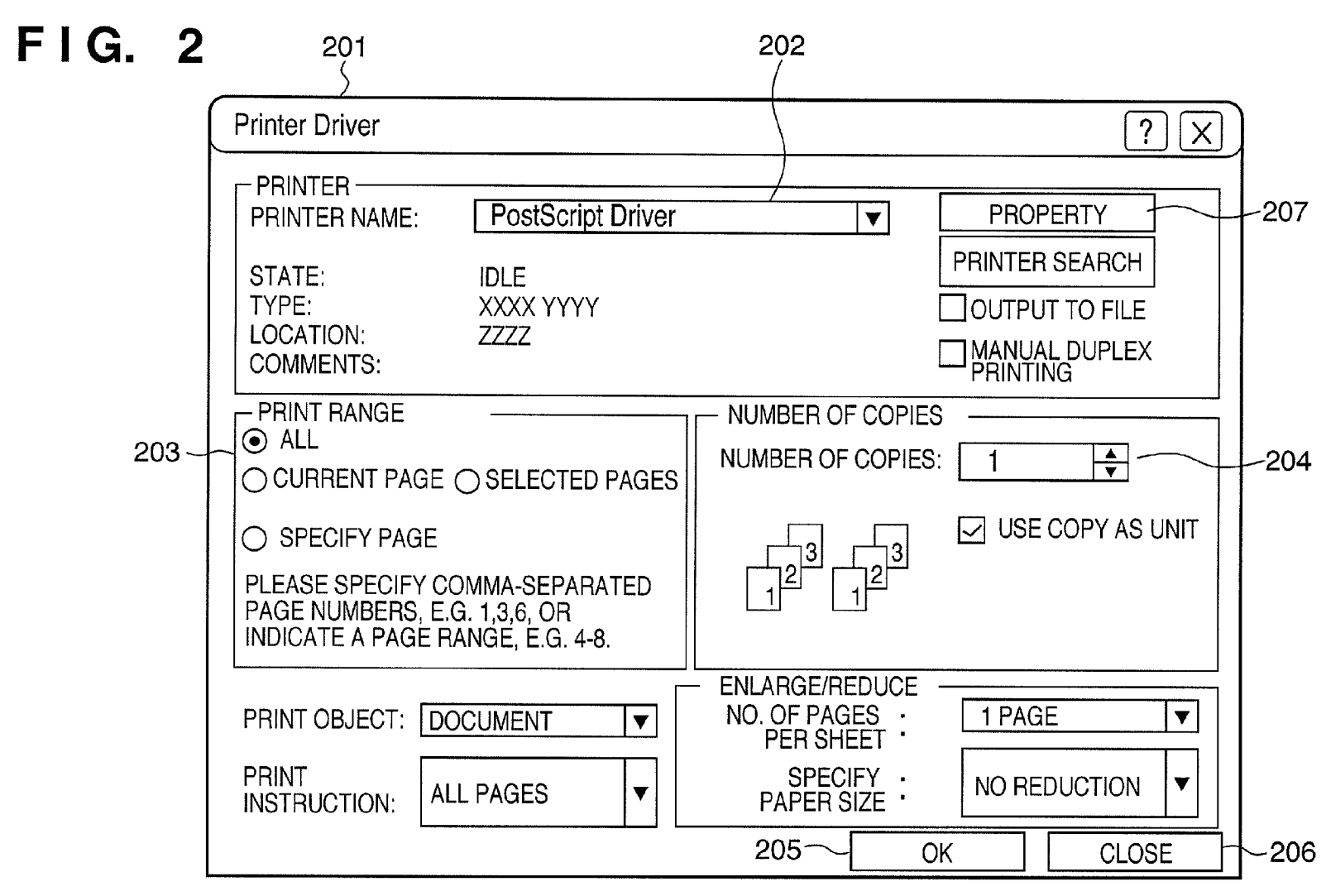

In FIG. 2, a window 201 of the printer driver is displayed, for instance, when selecting printer property settings supplied by the operating system. In the window 201, a selection column 202 is a transmission destination selection column used for selecting the output destination serving as the target destination. The user can select the desired output destination device of the system using the selection column 202.

A control 203 is a page setup control used to select output pages from a job. Using the radio buttons of the control 203, the user decides which page of the document (text) file created by the application software running on the client PC 101 is to be output. Using the page setup control 203, the user can select the page to be outputted for printing to a printer or another device in the system. Along with printing all the pages, the user can also have a specific page printed without printing all the pages.

A control 204 is a control used for setting the number of copies, to specify the number of copies of a job to be submitted for print output to the printer or another device in the system. By moving the cursor to this position and clicking the arrows (scrollbar arrows) shown in FIG. 2, the user can increase or decrease the number of copies. The print attribute data entered using the controls 202 to 204 is saved in association with the entire document file to be output.

A property button 207 is a property button used for configuring setup details for the transmission destination device selected in the transmission destination selection column 202. The printer driver exercises control such that various detail windows shown in FIG. 3 to FIG. 7 are displayed on the display screen of the computer in response to entries made by the user with the help of the button 207.

After configuring the desired settings using the various control windows shown in FIG. 2 to FIG. 7, the user, by pressing an OK button 205, can initiate printing in accordance with the print settings desired by the user. When cancelling this process, the user presses a close button 206, as a result of which a controller accepts the instruction, discontinues printing, discards the current user settings, and terminates the display of the window 201.

FIG. 3 to FIG. 7 depict control windows (GUI) displayed on the client computer's display screen in response to the user's clicking on the on-screen property button 207 shown in FIG. 2. The tabbed panels provided in this window include, for instance, "Page Setup", "Finishing", "Paper Supply", "Print Quality", etc. The user can click on these tabbed panels (issue instructions using controls, such as pointing devices, with which the client computer, not shown, is equipped). Depending on which tabbed panel is clicked, various types of detailed print output conditions can be configured, such as settings for "Page Setup", settings for "Finishing", settings for "Paper Supply", settings for "Print Quality", etc.

Figure 3:
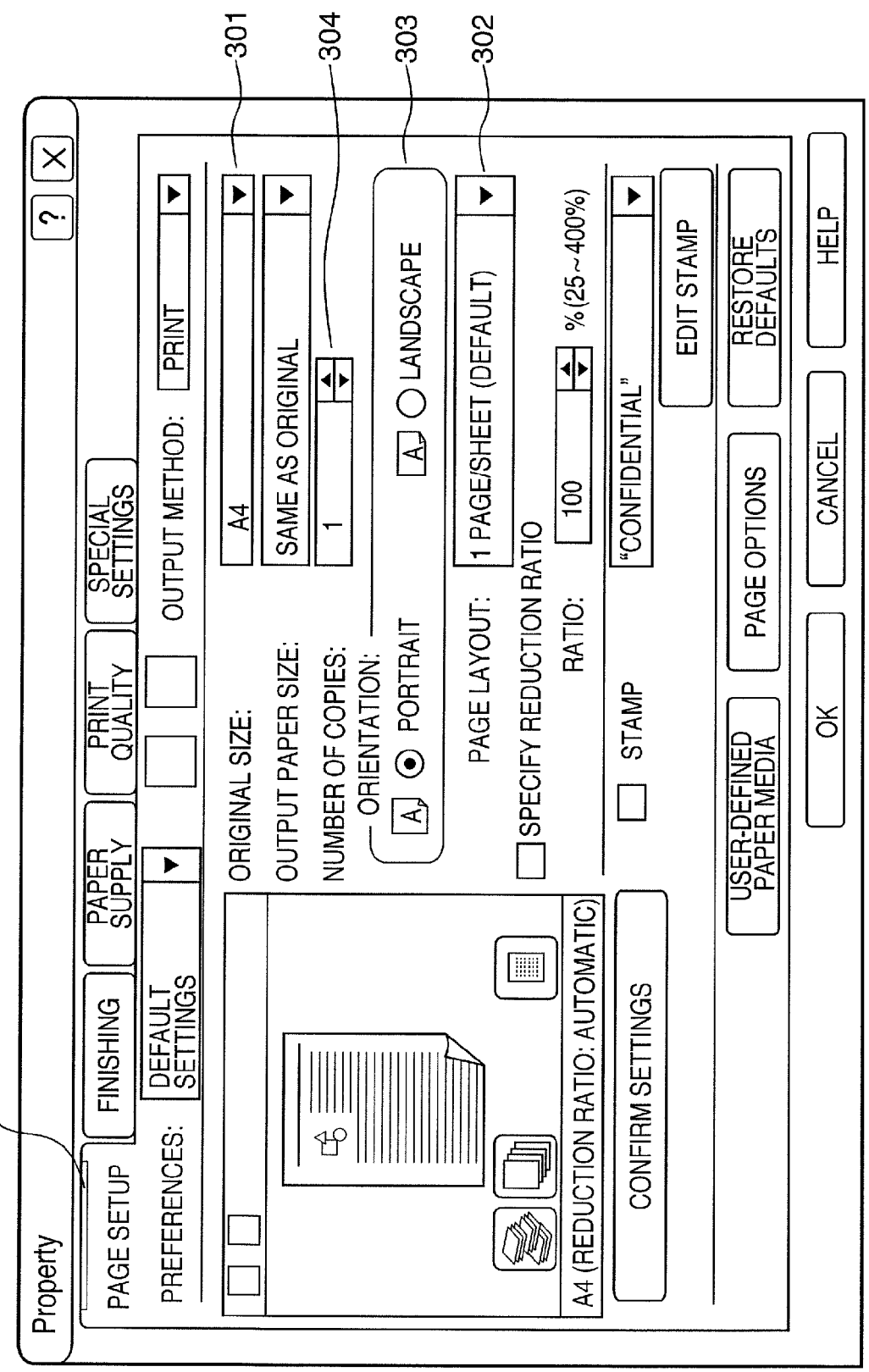
FIG. 3 is a diagram illustrating a page setup window display used in a printer driver.

FIG. 3 is an example of a control window (page setup window), which is displayed when a "Page Setup" tab 300 is clicked. This window includes a paper size setup section 301, a layout setup section 302, a paper orientation setup section 303, a copy number setup section 304, etc. The paper size setup section 301 is an area, in which the user configures the paper size of the recording paper used for the job to be printed. The layout setup section 302 is an area, in which the user reduces the layout in size and specifies the number of pages, whose size is reduced for printing on one side of a sheet using scaled layout. The paper orientation setup section 303 is an area, in which the user configures the orientation of the sheet using multiple options, such as, for instance, portrait (vertical) and landscape (horizontal), etc. The copy number setup section 304 is an area, in which the user configures the number of copies of the job to be processed. Using these setup areas, the user can configure the desired print settings described above.

Figure 4:
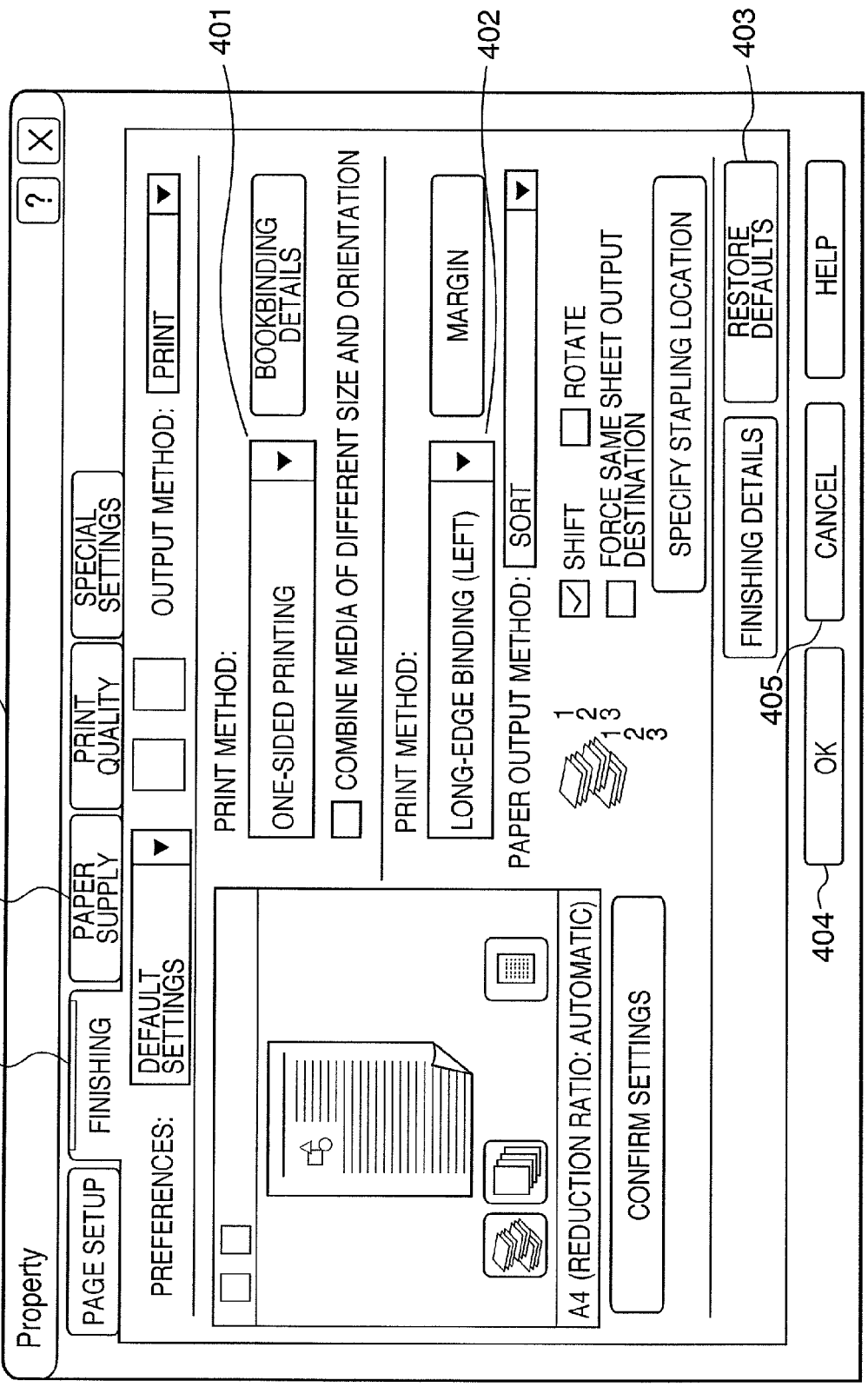
FIG. 4 is a diagram illustrating a finishing window display in a printer driver.

FIG. 4 is an exemplary control window (finishing window) displayed when a "Finishing" tab 400 is selected by the user with the help of the button. In the finishing window, the user can configure specific setup information related to the device selected by the user in the control window of FIG. 2 from among the devices the system is equipped with. For instance, it includes paper sheet-processing settings including finishing settings, such as stapling-related settings, sorting-related settings, punching-related settings, perforating-related settings, and bookbinding-related settings, as well as settings related to whether simplex or duplex printing is to be carried out. In addition, it also includes various detailed settings, such as more finely-tuned settings associated with image processing used to change color and other printer parameters, etc. For instance, the simplex or duplex printing mode can be selected using a setup section 401 of the control window of FIG. 4. The binding position (for instance, long-edge binding) can be configured using a setup section 402. The detailed print settings shown in the finishing window of FIG. 4 are reset to their initial values using a Default button 403.

In addition, when the user presses (clicks on) an OK button 404, print settings entered up to that point since opening the print setup window are saved as effective settings and the display returns to the window of FIG. 2. In addition, when a Cancel button 405 is pressed (clicked), settings entered up to that point since opening the print setup window are invalidated and discarded and the display returns to the window of FIG. 2.

Moreover, in the same way, a "Paper Supply" tab 410 permits selection of settings such as paper feed stages, for example, a "Print Quality" tab 420 permits selection of resolution and half tone-related settings, etc. All of these are print attributes used on an individual print job basis (for a single document file to be printed).

After setup, these settings are saved on a print job basis and passed on to the image forming device selected by the user with the help of the control window of FIG. 2. The image forming device performs printing and finishing operations in accordance with the print settings.

<Exception Setup>

Next, the method used for configuring a page or a range of pages with print attributes different from the print attributes of the job as a whole (referred to as "basic attributes") will be described. Configuring different print attributes only for a page or a range of pages in this manner is called exception setup.

Figure 5:
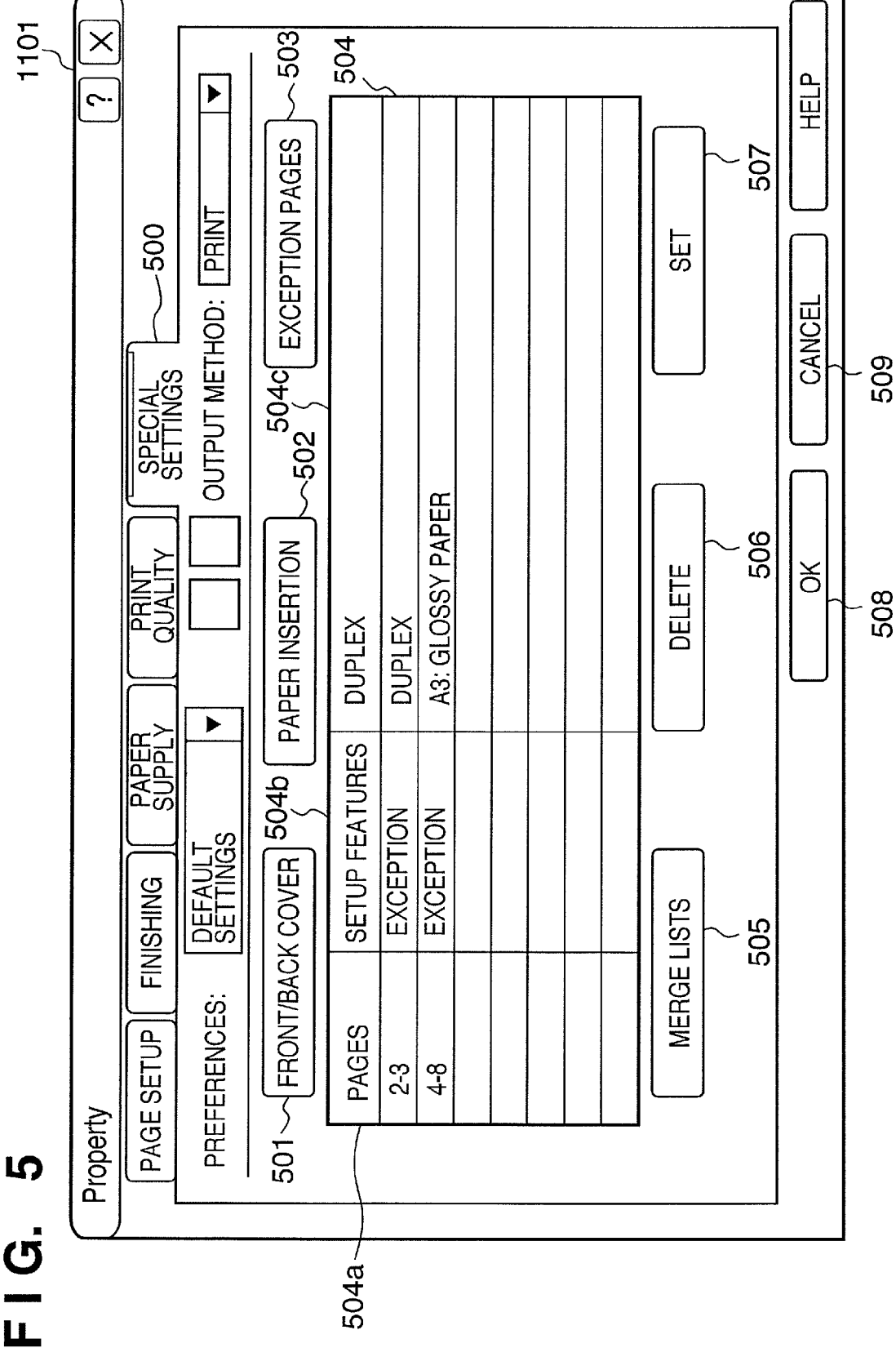
FIG. 5 is a diagram illustrating a special settings window display used in a printer driver.

FIG. 5 is an example of a control window (special settings window) displayed when a "Special Settings" tab 500 is pressed. The special settings window is a panel used to configure exception settings for a specific page or page range as alternatives to the print attributes configured for the job as a whole in "Page Setup" (FIG. 3), "Finishing" (FIG. 4), "Paper Supply", and "Print Quality". In this panel, a button 501 is used to configure the front and back cover separately from the text data. A button 502 is used to configure paper media separately from text data. A button 503 is used to configure a specific page or a page range differently from the setup of the job as a whole. Moreover, an exception settings list 504 is a list describing page ranges having attributes different from the print attributes of the job, configured using these buttons. In the exception settings list 504, Pages or Page Range 504*a*, Setup Features 504*b*, and Setting Contents 504*c*, which are to be configured, are displayed in the described order from the left column. It should be noted that the way they are displayed is merely an example, and other formats and parameters may be displayed in addition or as an alternative. The Page Range 504*a*, Setup Features 504*b*, and Setting Contents 504*c*, which are displayed in the same row, represent a single group of exception settings, which is called an exception range. The exception settings list is not only displayed, but is also saved as exception setup information that serves as a basis for display (see exception setup storage area 804 in FIG. 8). The saved exception setup information also has the same format as the exception settings list 504, with the Page Range 504*a*, Setup Features 504*b*, and Setting Contents 504*c*, which are displayed in the same row, associated with one another as a single group of exception settings.

It should be noted that there may be cases in which the same print attributes are configured for adjacent pages (or page ranges) in the exception settings list 504 created by the user. In such cases, the selected exception ranges are merged when the user selects the exception ranges to be merged from the exception settings list 504 and presses a Merge button 505. A Delete button 506 is provided for deleting exception ranges selected from the exception settings list 504. To do so, the exception ranges one wants to delete from the exception settings list 504 are pre-selected and deleted by pressing this button. The ranges, features, and contents of the settings in the exception ranges included in the exception settings list 504 can be modified using a Set button 506. To do so, the exception ranges one wants to change can be pre-selected from the exception settings list 504 and reconfigured by pressing the button 506. The modified exception settings list is reflected in the exception setup information.

Figure 6:
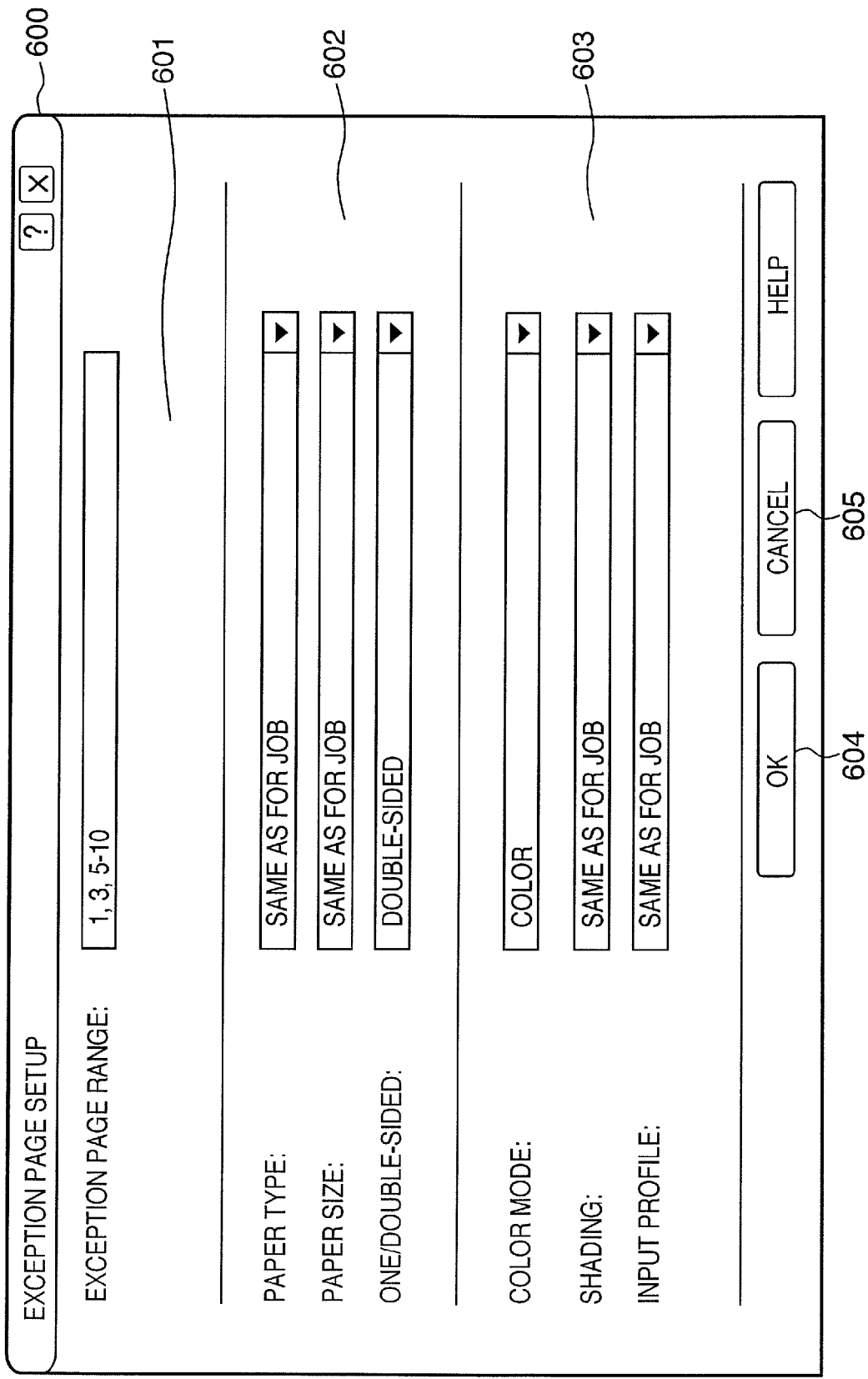
FIG. 6 is a diagram illustrating a page exception detail setup dialog window used in a printer driver.

FIG. 6 shows a dialog 600, which is displayed when the exception page setup button 503 is pressed on the special settings property window of FIG. 5. In the dialog 600, a specific page or a page range is configured differently from the job. It should be noted that such a specific page or page range is termed "page range". Here, a control 601 is a control used for setting page ranges subject to exception setup. If the same page number is entered as the applicable start page and applicable end page when the user wants to specify a certain page as a page range, content and setup features configured using the following controls are applied to the page. A control 602 is used to configure exception settings different from the settings of the job for the page range set by the control 601. The control 602 permits configuration of media-related exception settings. Specifically, it allows for configuring paper media type, paper size, and simplex/duplex printing. A control 603 is used to configure exception settings different from the settings of the job as a whole for the page range set by control 601. The control 603 permits configuration of color-related exception settings. Specifically, it allows for configuring color modes, half-tone, and input profiles. After configuring the desired settings using the various controls shown in FIG. 6, the user can apply the settings desired by the user by pressing an OK button 604. In other words, the exception setup information is saved. When cancelling the settings, the user presses a Cancel button 605, as a result of which the printer driver receives the instruction, discards the contents of the settings, and terminates the display of FIG. 6.

The tabbed panel "Special Settings" 500 (FIG. 5) and "Exception Page Setup" dialog 600 (FIG. 6) permit configuration of page exception settings. It should be noted that although an exemplary method of exception setup has been described herein, as explained in "Background Art", there are other methods of configuring page exception settings.

The basic operating procedure is to specify a page or a page range and to configure exception settings with the help of dialogs or tabbed panels used to configure exception settings for print attributes.

Figure 7:
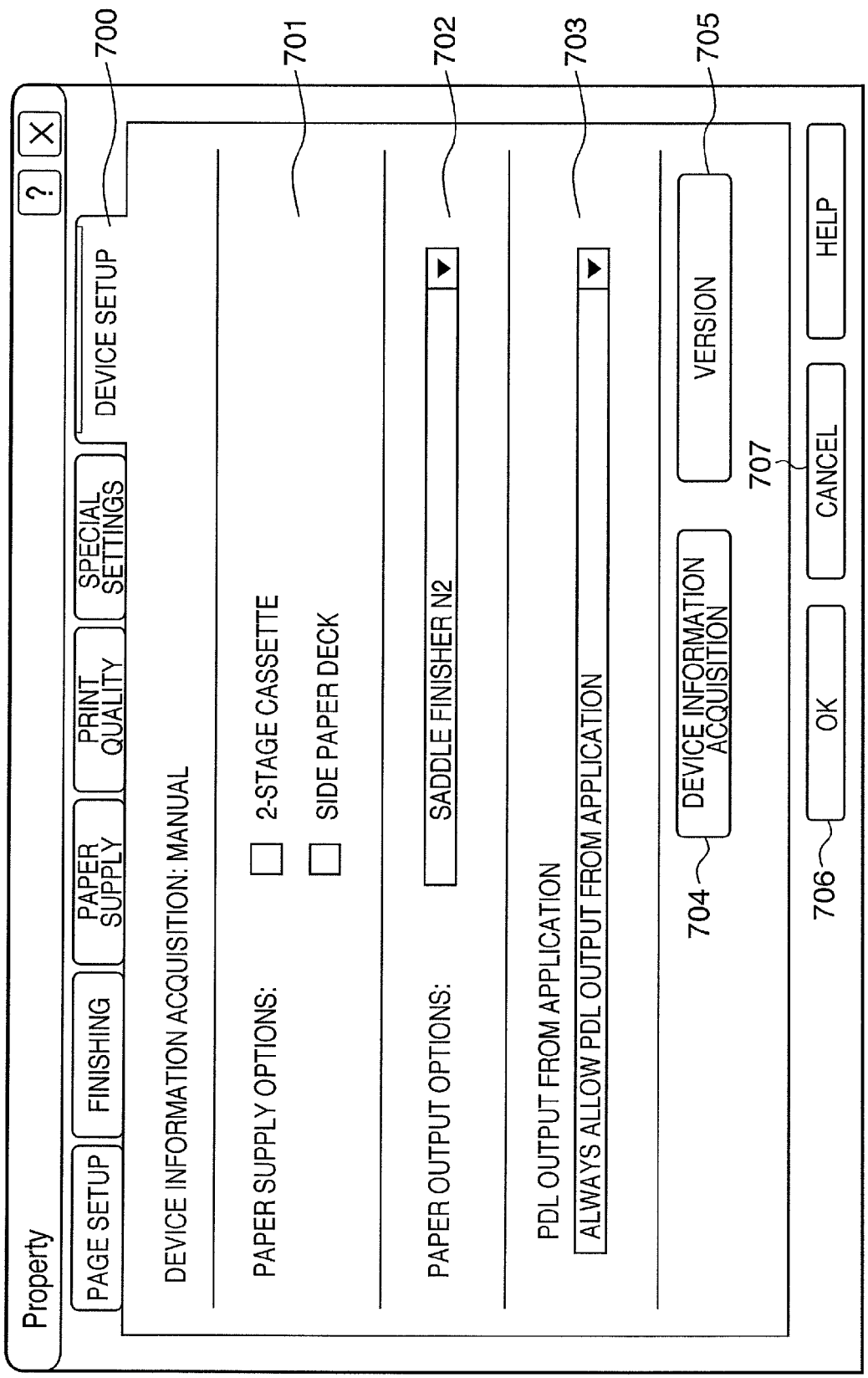
FIG. 7 is a diagram illustrating a device setup window display used in a printer driver.

While the window illustrated in FIG. 3 is a window that opens when configuring printer settings in an application program, FIG. 7 is a dialog that opens from a menu used to configure printer settings in a printer driver. In FIG. 7, a "Device Setup" panel, 700, is additionally displayed. The tabbed panel "Device Setup" of FIG. 7 makes it possible to provide device setup information and configure the printer driver. A control 701 is a control used to configure how paper supply options are installed. A control 702 is a control used to configure how paper output options are installed. After configuring the desired settings using the various controls shown in FIG. 7, the user can apply the settings desired by the user by pressing an OK button 706. When cancelling the settings, the user presses a Cancel button 707, as a result of which the printer driver receives the instruction, discards the contents of the settings, and terminates the display of FIG. 7.

As described above, the user makes use of the various print setup windows of FIG. 2 to FIG. 7 on the client PC 101 to configure the desired output conditions among the printing conditions, including various detailed settings and page exception settings. Upon completion, the client computer sends a print job output request, print condition data (print attributes) for the job, and the print data associated with the print job. By doing so, the client PC 101 can control the output device selected by the user from the devices that the system is equipped with (including various printers, MFP devices, and other image forming devices) in accordance with the configured print attributes.

[Regarding Printer Driver Configuration]

Figure 8:
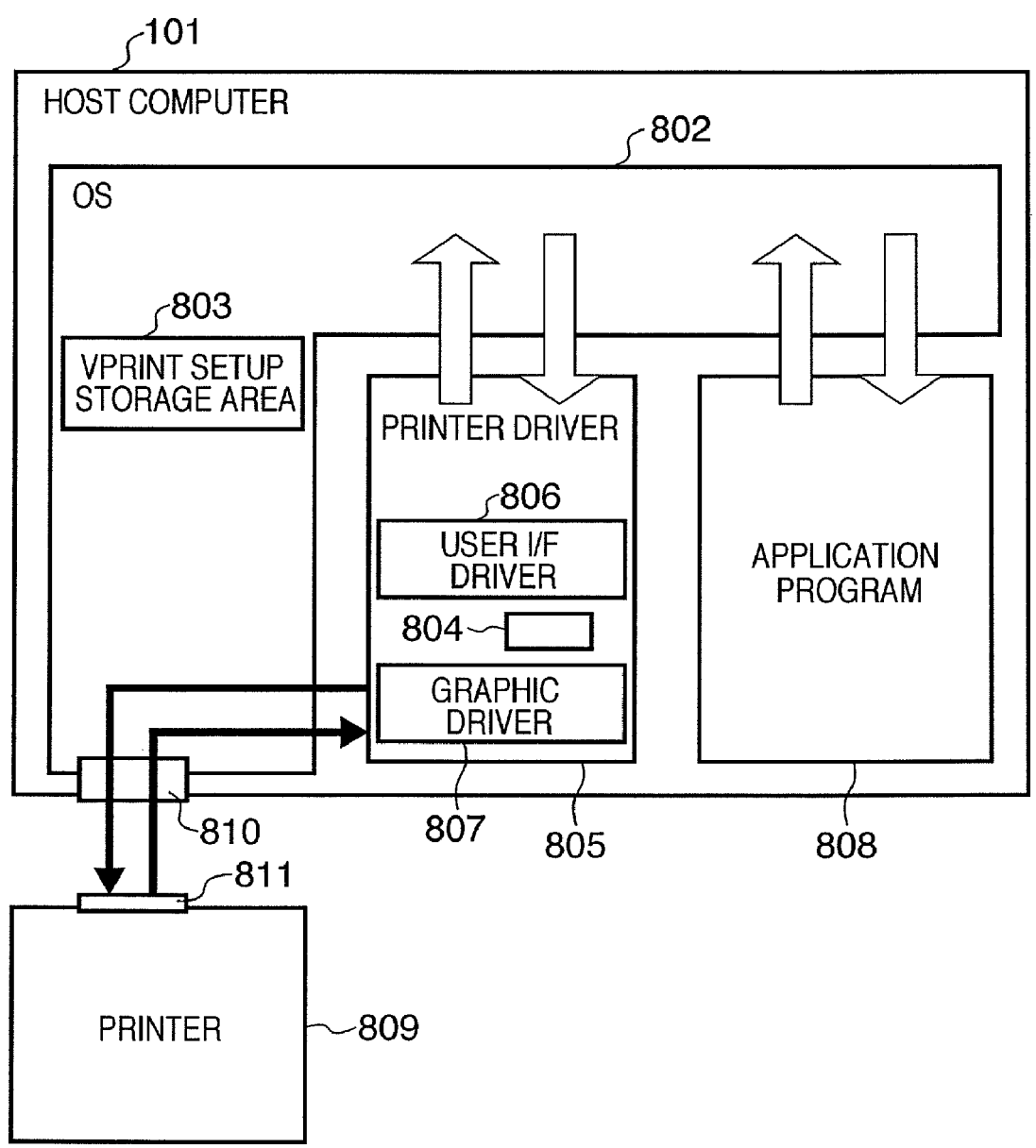
FIG. 8 is a block diagram of applications, OS, and printer drivers installed on a client computer.

FIG. 8 illustrates schematically the configuration of software in the client PC 101, including a printer driver 805. An operating system (OS) 802 is installed on the client PC 101. The printer driver 805 and an application program 808 are installed on the OS 802 and are controlled by the OS 802. The OS 802 provides I/O functionality to the application program 808 and, from the standpoint of the application program 808, the printer driver 805 operates as part of the OS 802.

The printer driver 805 has a user I/F driver 806 and a graphic driver 807. The user I/F driver 806 displays a user I/F, saves-settings, etc. The graphic driver converts graphic commands issued by the application program 808 via the OS 802 into code that can be interpreted by a printer 809. The user I/F driver 806 displays the property panels and print setup dialogs of FIG. 2 to FIG. 7 when print settings are specified by the application program 808 through the OS 802.

It should be noted that a print setup storage area 803 of the printer driver is part of the storage area managed by the OS 802. The print attributes configured by the user using the user I/F driver 806 are saved in the print setup storage area 803. Moreover, the user I/F driver 806, graphic driver 807, and application program 808 can access the print setup storage area 803 through the OS 802 and can read the print attributes configured by the user. The print attribute setup values saved in the print setup storage area 803 can be referenced as the default values of the print settings. For instance, print attributes can be provided in an XPS document by associating print tickets with the document. However, default values are required for the print settings when there are features that are not defined in the print tickets associated with the document, or when no print tickets are associated therewith. Accordingly, the setup values saved in the print setup storage area 803 are referenced as the default values.

The exception setup storage area 804, which is used to store exception setup information, is stored by the printer driver 805. This is an area used to save exception setup information created in accordance with the procedures of FIG. 16A and FIG. 16B. The exception setup storage area 804 is created based on the print tickets associated with the XPS document.

In addition, it is connected to a communication I/F 810 of the client PC 101 and to a communication I/F 811 of the printer 809 through a network or another communication channel. The graphic driver 807 can transmit print data to the printer 809 through the OS 802. Moreover, setup information, status, and other information on the printer 809 can also be acquired via the OS 802.

The components of the client PC 101 shown in FIG. 8 are implemented as software modules executed by the CPU of the client PC.

[Printing Workflow]

Figure 9:
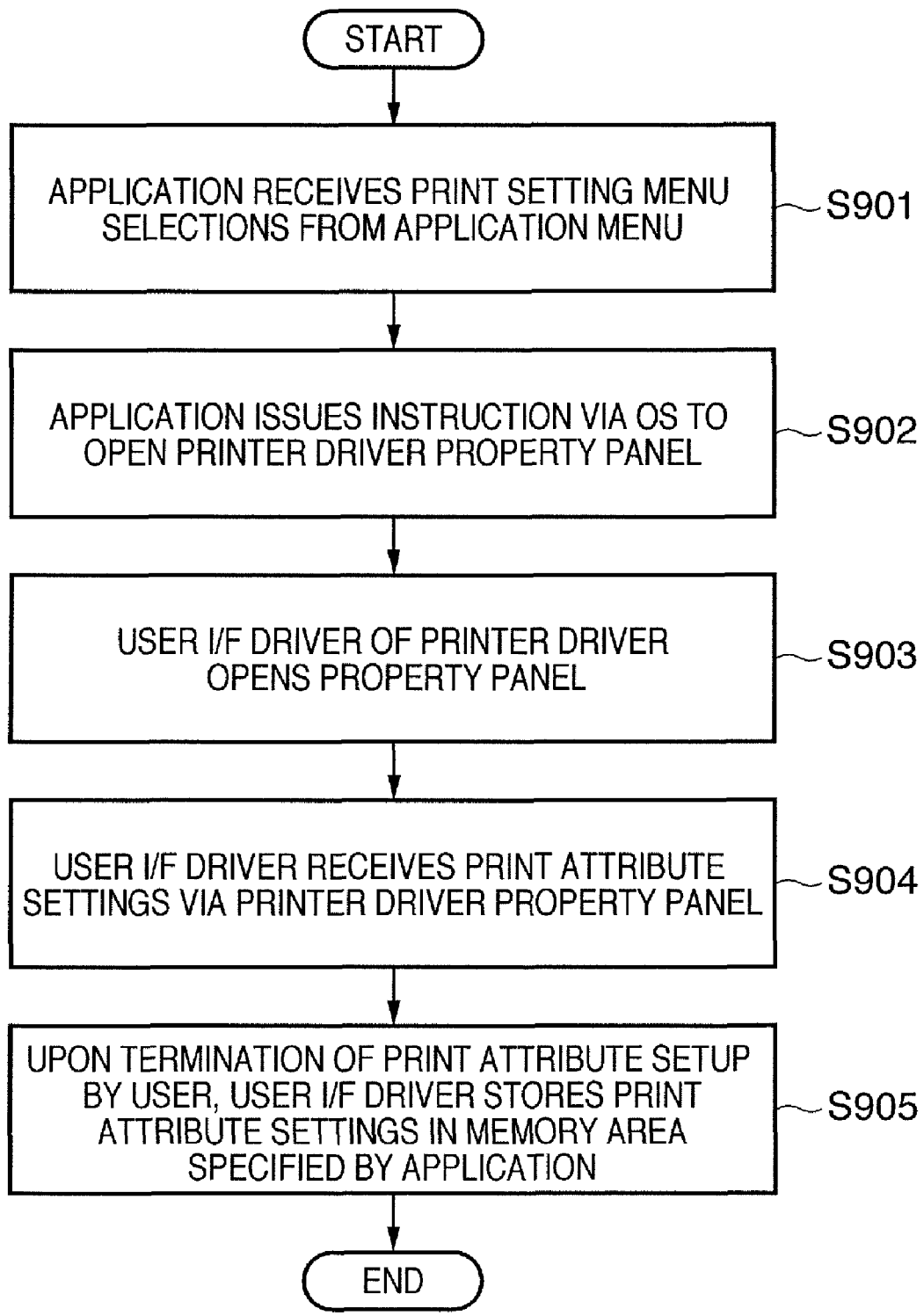
FIG. 9 is a flow diagram, in accordance with which the user configures print attributes in the printer driver.
Figure 10:
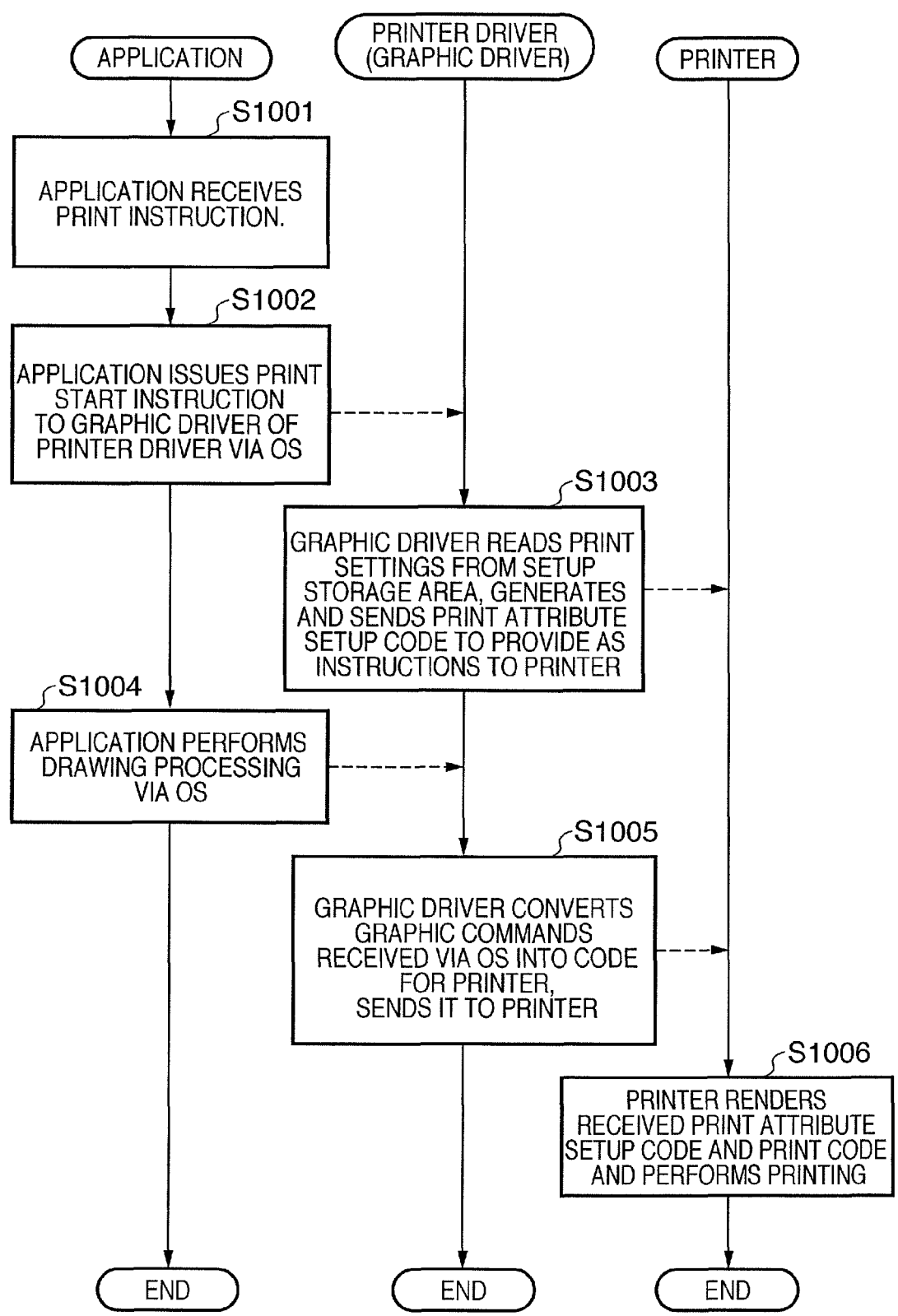
FIG. 10 is a printing flow diagram.

Next, workflow will be described, in which the user selects a print menu from an application menu, configures print attributes in the printer driver, and obtains print output. FIG. 9 and FIG. 10 are flow diagrams illustrating the procedure from the moment when the user issues a print instruction to the moment the job is printed.

In FIG. 9, S901 and S902 are carried out by the application program 808, and S903, along with the subsequent steps, is executed by the printer driver 805.

First of all, in S901, the application program 808 receives print setting menu selections made by the user. As a result of this operation, in S902, the application program 808 calls the API of the OS 802 and instructs the printer driver 805 to display the print attribute setup property panel. The term "API" is an abbreviation of "Application Programming Interface". At such time, the application program 808 secures an area for saving print settings in memory and informs the API of the secured print setup storage area. Based on this instruction, the OS 802 issues an instruction to the printer driver 802 to display the print attribute setup property window.

Upon receipt of the instruction, in S903, the user I/F driver 806 of the printer driver displays the print attribute setup property window depicted in FIG. 2. Subsequently, in S904, the user I/F driver 806 receives the entry of print attribute settings by the user through the dialogs and property windows shown in FIG. 2 to FIG. 7 above. After configuring the print attribute settings, the user confirms the configured print attributes by pressing the OK button on the property window of FIG. 2. Upon depression of the OK button, in Step S905, the user I/F driver 806 saves the entered print attribute setup values in the print setup storage area specified by the API call. This completes the setup of print attributes and saving of the setup values.

FIG. 10 shows the procedure starting from the print instruction to the moment when printing is carried out. In FIG. 10, steps S1001, S1002, and S1004 are executed by the application program 808. Steps S1003 and S1005 are executed by the printer driver, and step S1006 is executed by the printer. In S1001, the application program 808 receives the user's instruction to perform printing. In response to this instruction, in S1002, the application program 808 calls the API of the OS 802 and issues a print start instruction to the printer driver 805. It should be noted that in some cases the print setup dialog shown in FIG. 2 is displayed during this process. When the instruction to start printing is issued, the application 808 indicates to the API the location of the print setup storage area 803 in memory. Upon receipt of the print instruction, the OS 802 issues a print start instruction to the printer driver 805.

Figure 12:
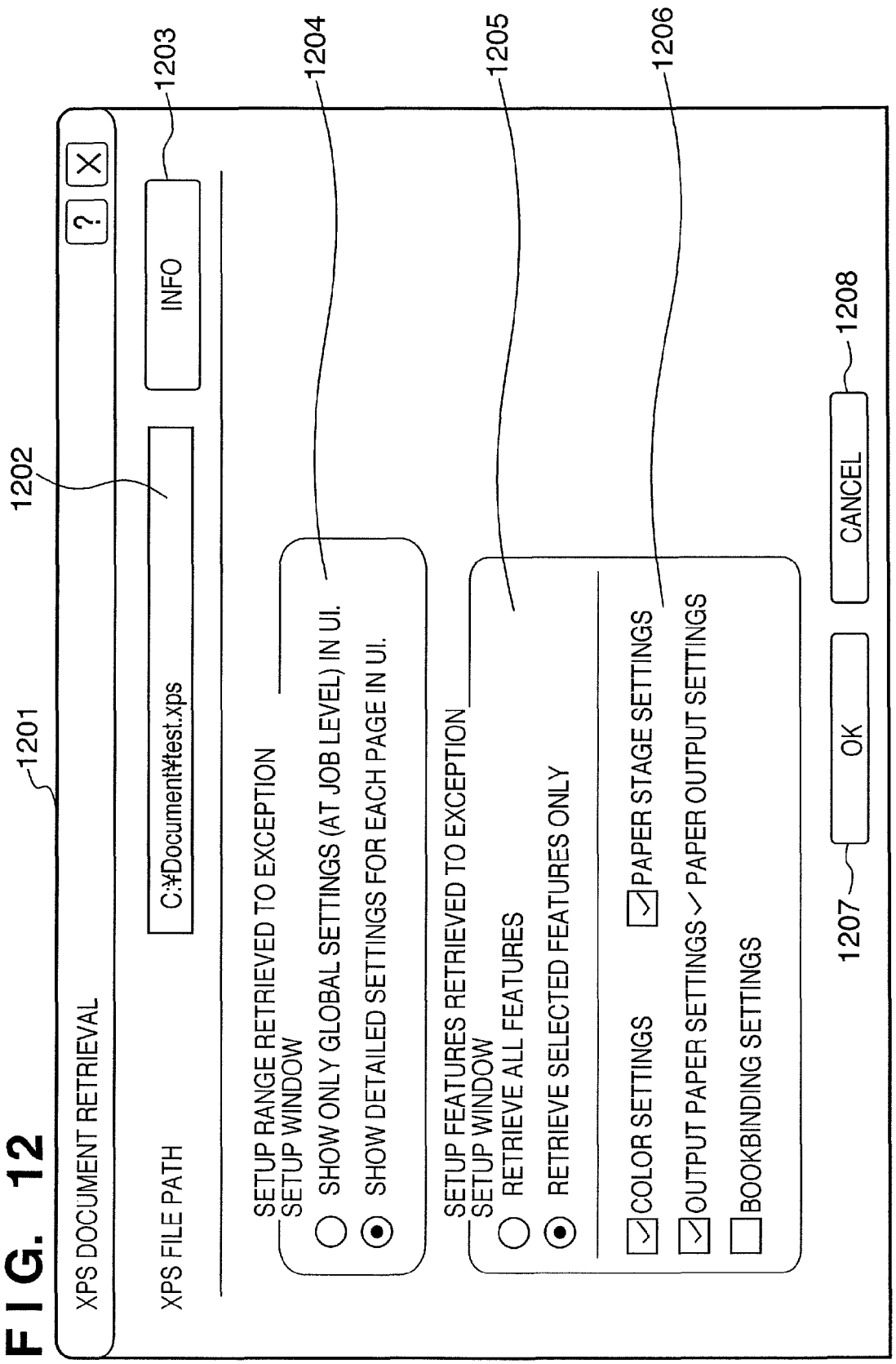
FIG. 12 is a diagram illustrating an XPS document retrieval window display.
Figure 16A:
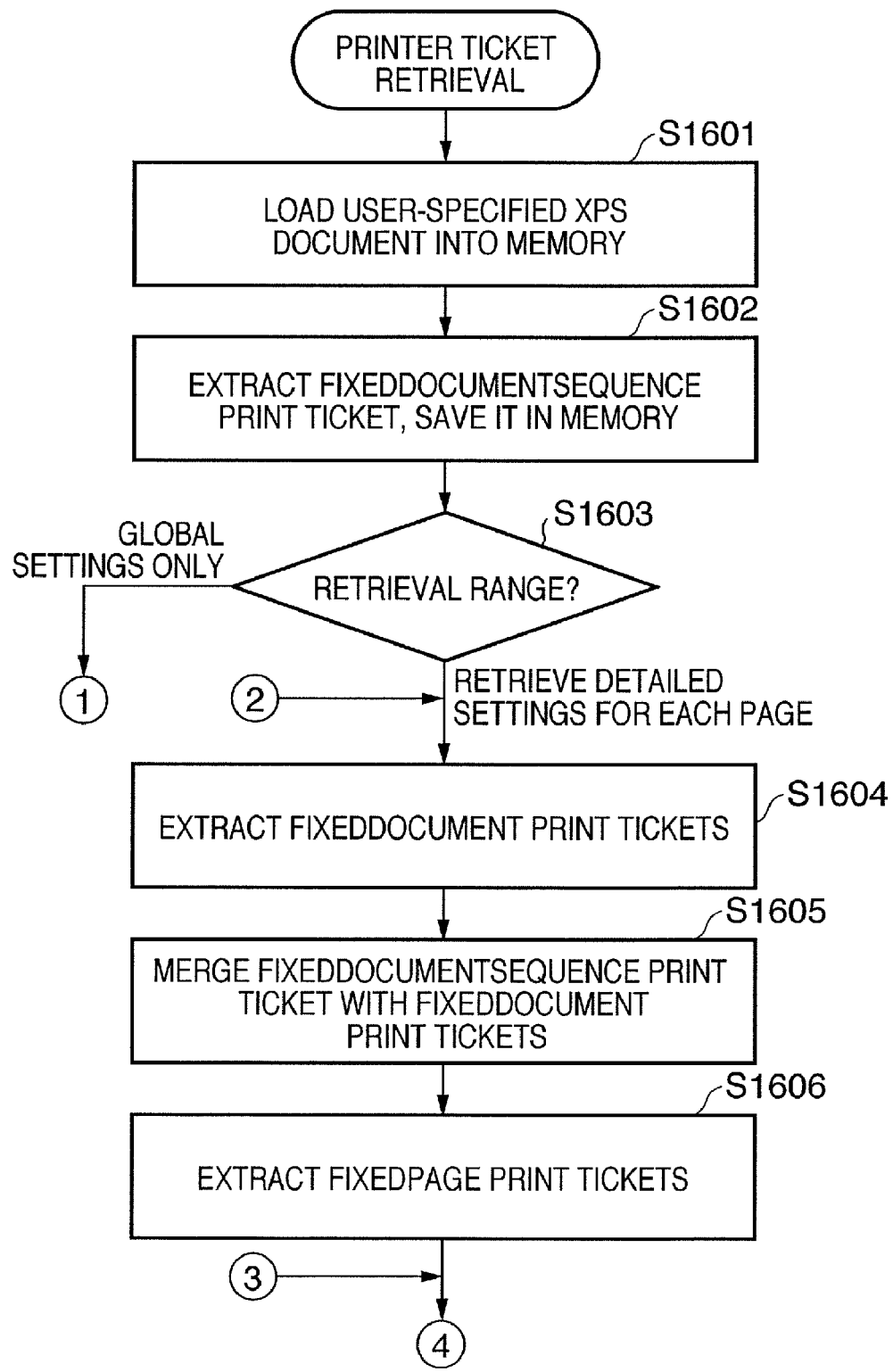
Figure 16B:
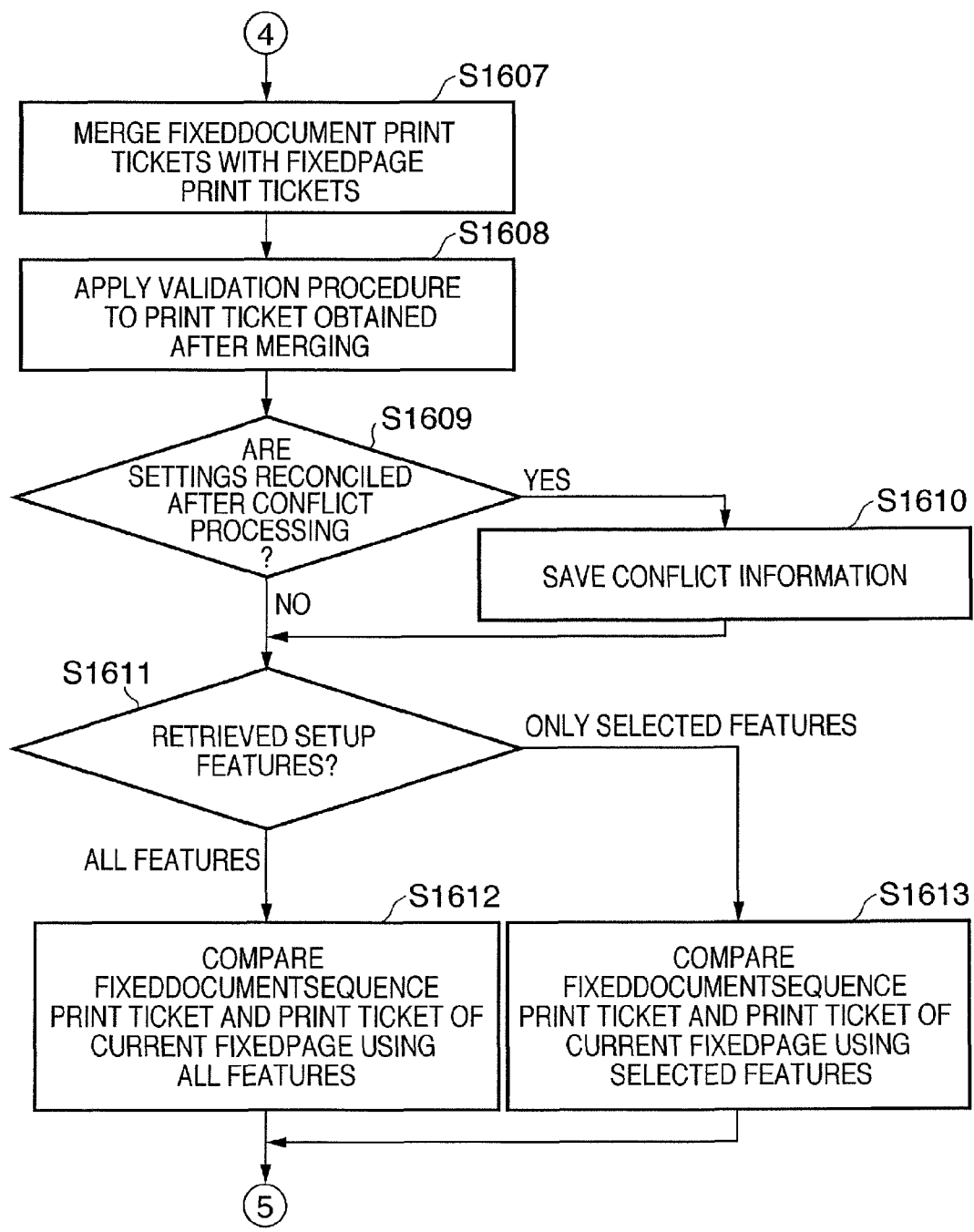
Figure 16D:
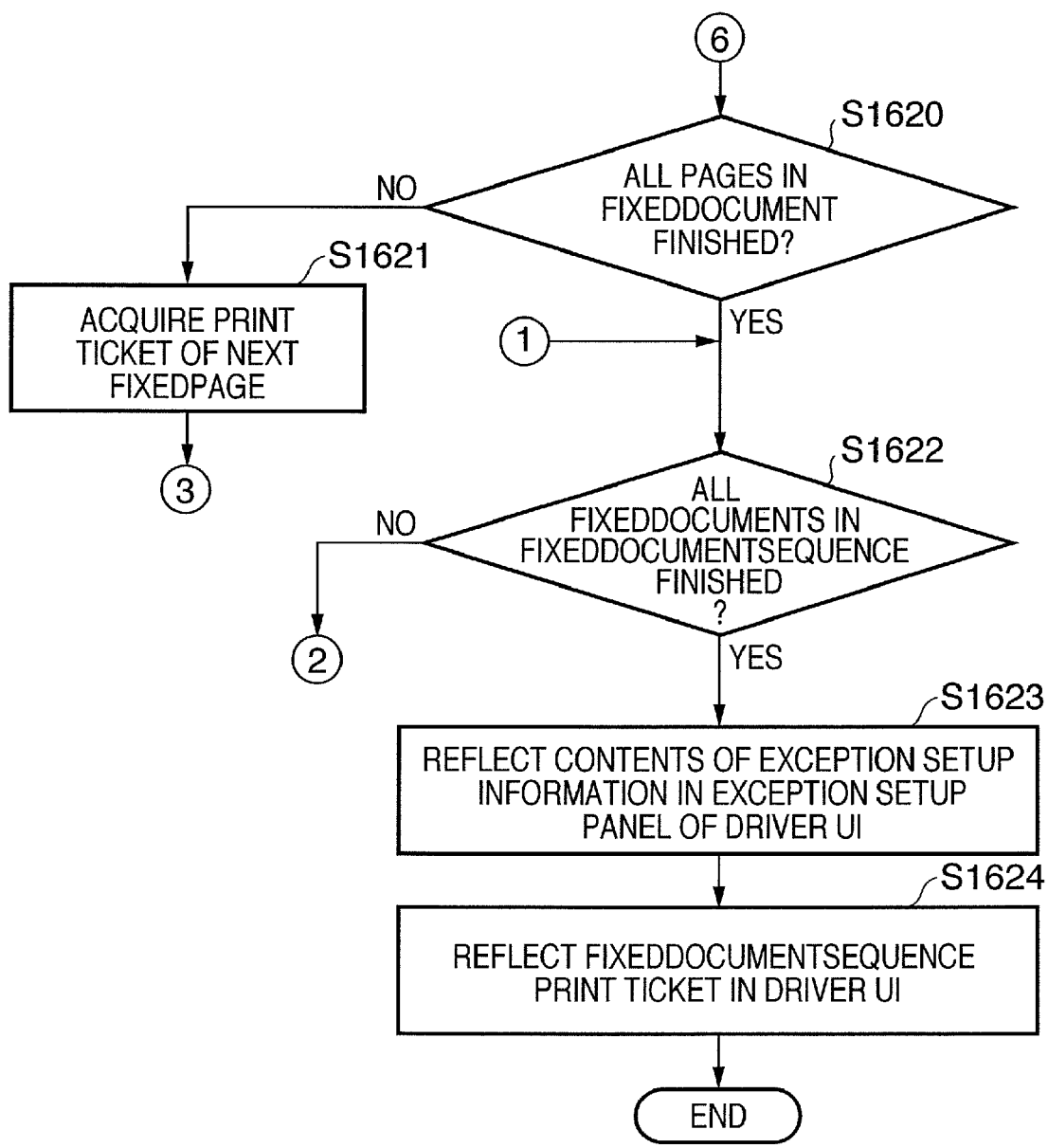

In S1003, the graphic driver 807 reads the print attribute setup values held in the print setup storage area 803 specified in S1002 in response to the print start instruction, generates print attribute setup code, and transmits it to the printer 809. It should be noted that when print tickets are associated with the XPS document, the job-level print ticket is read by the user I/F driver 806 and merged with the default values saved in the print setup storage area 804. The merged print setup information is preferably saved in another area without overwriting the print setup storage area 803. In S1003, print attribute setup code is generated based on the merged print setup information. When there are exception settings (document level or page-level print tickets) specifying page ranges, in the subsequent Step S1004, they may be associated with the relevant pages of the document data and transmitted to the printer. The exception setup information created according to the procedures of FIG. 16A and FIG. 16B described below is referenced when generating print attribute setup code for exception settings. In FIG. 16A and FIG. 16B, the retrieved exception setup features are limited to the features set in advance as shown in FIG. 12 (described below). Therefore, even if print settings that cannot be modified on a page-by-page basis are described in a print ticket, they may not be reflected in the printing process. An alternative method that may be used is to recreate the print attribute setup code before and after the page range with exception settings and transmit this print attribute setup code first of all, prior to the document data.

On the other hand, after S1002, the application program 808, in S1004, carries out a drawing process based on the document data to be printed. The drawing process is carried out through the API provided by the OS 802, with graphic commands passed on to the printer driver 805.

In S1005, the graphic commands directed to the OS 802 are input into the graphic driver 807. The graphic driver 807 converts the received graphic commands into print code that can be interpreted by the printer 809 and transmits it to the printer.

In S1006, the printer 809 carries out rendering based on the received graphic code and print attribute setup values and completes the print job by carrying out printing.

The above-described procedure allows the user to configure print attributes and produce print output.

[Flow of Print Attribute Reading in XPS Document in Present Invention]

Figure 19:
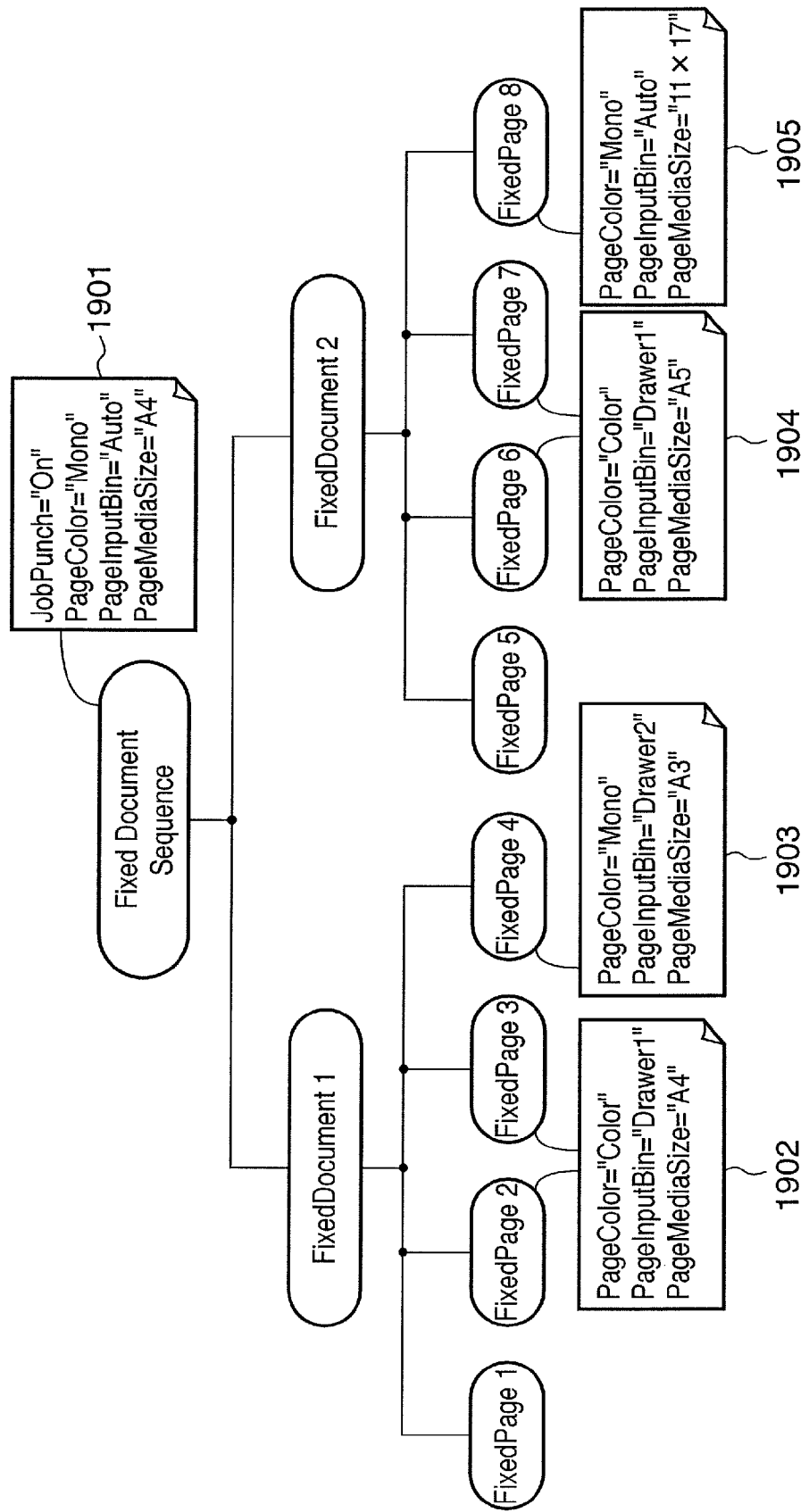
FIG. 19 is a diagram illustrating an example of print attributes in an XPS document.

The flow of print attribute setup in the present embodiment will be explained next. In the present embodiment, the print settings of an XPS document, such as the one illustrated in FIG. 19, are displayed and edited, and the document is printed. The XPS document shown in FIG. 19 is a FixedDocumentSequence (corresponding to a document) composed of two FixedDocuments (corresponding to sections) each having four FixedPages (corresponding to pages). A print ticket 1901 represents the print attributes of the entire FixedDocumentSequence, that is, the document. In the print ticket 1901, JobPunch, which is a hole-punching function attribute, is set to "On" and PageColor, which is a color attribute, is set to a monochromatic setting, "Mono". PageInputBin, which is a paper feed stage attribute of the output paper media, is set to an automatic setting, "Auto", and PageMediaSize, which is an output paper size attribute, is set to "A4". The print attributes shown in FixedDocumentSequence are inherited by the lower-level FixedDocuments and FixedPages as basic settings. A print ticket 1902 is associated with FixedPage2 and FixedPage3, which belong to the lower level of the FixedDocument1, and a print ticket 1903 is associated with Fixedpage4. If conflicting values are set up for the same attribute feature in an upper-level print ticket and a lower-level print ticket, the lower-level print ticket is given priority. In other words, the contents of the print attributes of the print ticket 1901 are overwritten by the print attributes of the print tickets 1902, 1903. Moreover, because no print tickets are specified for FixedPage1, it inherits the print attributes of the print ticket 1901 "as is".

A print ticket 1904 is associated with FixedPage5 and FixedPage6, which belong to the lower layer of the FixedDocument2, and a print ticket 1905 is associated with FixedPage8. Here, if the print attributes of the print ticket 1901 of the FixeDocumentSequence and the print attributes of the print tickets 1902 to 1905 of the FixedPages are different, it can be inferred that the print attributes of said FixedPages have exception settings.

Figure 11:
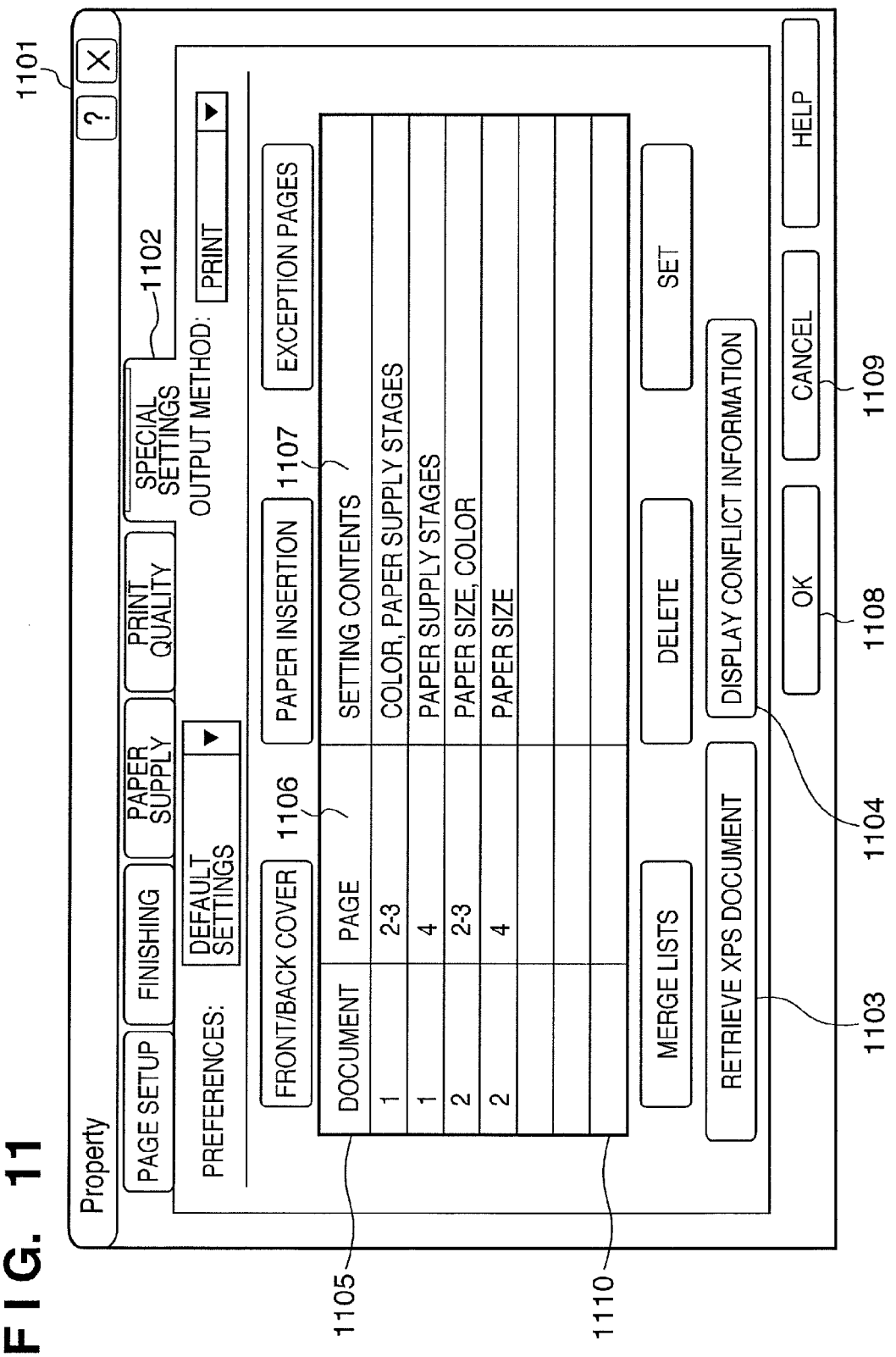
FIG. 11 is a diagram illustrating a special settings window display used in a printer driver.

FIG. 11 shows a print setup window 1101 used in the present embodiment. When the user clicks on the special settings tab, a special settings panel 1102 is displayed. A button 1103 is an XPS document retrieval button which the user presses to retrieve the print attributes of the XPS document onto the special settings panel. A button 1104 is a display button used for conflict information. The button 1104 is used to display information on contradictory attributes if an invalid combination of settings is present in the print tickets of an XPS document when the XPS document is retrieved. In case of contradictory attributes, it is necessary to change either one of them or both to setup values that would eliminate the contradiction. In the present embodiment, such a setup value change is called "reconciling the attributes". A special settings display section 1110 is an area used for displaying the special settings of the print tickets in the XPS document retrieved by the user I/F driver 806. It includes a display section 1105, which shows the number of the document with special settings, a display section 1106, which shows page ranges, and a display section 1107, which shows the setting contents of the special settings. When the user presses the Retrieve button 1103, a document retrieval window 1201 (FIG. 12) is displayed.

As shown in FIG. 12, the document retrieval window 1201 has a text box 1202, which is used to specify the XPS file path, a file path information button 1203, a retrieved setup range specification section 1204, and a retrieval method specification section 1205. Furthermore, it has a retrieved setup feature specification section 1206, an OK button 1207, and a cancel button 1208. The user specifies the file path of the XPS document the user wants to retrieve print attributes for on the special settings panel, in the text box 1202. The file path can also be specified in a file specification dialog (not shown) by pressing the file path information button 1203. The settings received in FIG. 12 are saved, for example, in the print setup storage area 803.

The retrieved setup range specification section 1204 is used to specify the level of the retrieved print tickets of the XPS document specified in the text box 1202. It permits selection of options such as retrieving a print ticket with the global print job-level settings only, or retrieving print tickets for all the FixedPages belonging to the FixedDocumentSequence of the XPS document. The operation of the user I/F driver 806, which receives this selection, corresponds to a range selecting means (step).

The retrieval method specification section 1205 makes it possible to select whether to retrieve all the attributes specified in the print tickets in the XPS document or only the attributes selected by the retrieved setup feature specification section 1206. Here, when the "Retrieve All Features" option is selected in the retrieval method specification section 1205, the retrieved setup feature specification section 1206 is not displayed. The operation of the user I/F driver 806, which receives this selection, corresponds to a feature selecting means (step).

When the configuration of all the settings in the document retrieval window 1201 is complete and the user presses the OK button 1207, the user I/F driver 806 retrieves the print tickets of the XPS document specified in the text box 1202. The retrieval of print tickets performed by the user I/F driver 806 will be now explained using the flow charts of FIGS. 16A to D. Here, it is assumed that an XPS document has been specified that has print tickets such as those shown in FIG. 19.

Despite the fact that the explanations mention the reference numerals of FIG. 19, the procedure of FIGS. 16A to D is applicable to XPS documents of any structure.

In S1601, the apparatus reads the XPS document specified in the text box 1202, from the specified location, for instance, a file storage unit such as a hard disk, and loads it into memory. The XPS document is described using XML, with FixedDocumentSequence, FixedDocuments, and FixedPages defined using tags in the document. S1601 corresponds to a document reading step.

The job-level print ticket 1901 associated with the FixedDocumentSequence of the XPS document loaded into memory is extracted in S1602. S1602 corresponds to an attribute reading step. In S1603, with account taken of the setup values of the retrieved setup range specification section 1204, it is determined whether the configured range encompasses all pages or individual pages. In S1603, processing advances to S1622 if it is determined that the setting is to "Show only global settings (at job level) in the UI". On the other hand, in S1603, processing advances to S1604 if it is determined that the setting is to "Show detailed settings for each page in the UI".

In S1604, the program focuses on the FixedDocuments, and the print tickets associated with the FixedDocuments are extracted. Attention to the FixedDocuments is directed in the order of their descriptions in FixedDocumentSequence. In the XPS document of FIG. 19, no print tickets are specified for any FixedDocument. Accordingly, each FixedDocument inherits the print attributes of the print ticket 1901 specified in the FixedDocumentSequence.

Next, in S1605, the document-level print tickets extracted in S1604 are merged with the job-level print ticket. Because no document-level print tickets are specified, the print ticket obtained after merging has the same contents as the job-level print ticket 1901 shown in FIG. 19.

Next, in S1606, attention is directed to the FixedPages described in the FixedDocuments of interest and the print tickets associated with the FixedPages are extracted. Attention to the FixedPages is directed in the order of their descriptions in FixedDocuments.

Next, in S1607, the document-level print tickets obtained by merging in S1605 are merged with the page-level print tickets extracted in S1606. The processing carried out in S1607 determines the print tickets of the pages of interest.

In S1608, a compatibility check is carried out to determine whether there are mutually contradictory settings in the determined print tickets. If there are mutually contradictory settings at such time, the setup values are modified (reconciled) to avoid contradictions. As for attribute features with incompatible setup values, the features and the values are saved, for instance, in a table, etc., and the table is used to decide whether they are incompatible. Moreover, setup values used to eliminate the contradictions are saved in the table as well. Thus, incompatible settings are determined using the table and either some or all of the setup values are modified. This process corresponds to a reconciliation step.

In S1609, it is determined whether the settings of the print tickets have been reconciled in S1608 (which is called validation). If it is determined that the settings have been reconciled, processing advances to S1610. On the other hand, if it is determined that the settings have not been reconciled, processing advances to S1611. Here, determination as to whether the settings have been reconciled is made possible by comparing print tickets before the compatibility check with print tickets after the compatibility check and verifying whether the values of the attributes have changed.

In S1610, conflict information regarding the attributes reconciled in S1608 is stored in conflict information 1501 of FIG. 15. In this embodiment, the conflict information 1501 is described using XML as well. The conflict information 1501 has a hierarchical structure. A conflict information tag, 1502, indicates conflict information as a whole. A document number tag, 1503, shows the document number of the FixedDocument comprising the FixedPages, between which the conflict took place. In addition, a conflicting page information tag, 1504, shows information on the pages, between which the conflict took place. The conflicting page information tag 1504 includes a start page number tag 1505, which shows the starting number of the pages between which the conflict took place, and an end page number tag 1506, which shows their ending number, and a setup feature tag 1507, which shows the conflicting setup features. In addition, the setup feature tag 1507 shows the title of the setup feature that experienced a conflict and was reconciled. A pre-modification setup tag, 1508, and a post-modification setup tag, 1509, are included in the setup feature tag 1507. These are areas used to store settings before and after reconciliation, respectively. The conflict information 1501 corresponds to a reconciliation information holding means. In addition, S1610 corresponds to a reconciliation information holding step.

In addition, in S1610, the tags 1502 through 1509 are used to store setup reconciliation information, which permits display of a conflict information window, 1301, as shown in FIG. 13. The conflict information 1301 can be displayed by pressing the conflict information display button 1104 shown in FIG. 11. In the conflict information window 1301, information, based on conflict information 1501, is displayed in areas 1302 through 1306. The user I/F driver 806 displays the information of the document number tag 1503 in a document number display area, 1302, and, in addition, displays the information of the starting page number tag 1505 and ending page number tag 1506 in a page number area, 1303. Moreover, it respectively displays setting titles corresponding to the contents of the setup feature tag 1507 in a conflicting setting content display area 1304, the information of the pre-modification setup tag 1508 in a pre-modification setup display area 1305, and the information of the post-modification setup tag 1509 in a post-modification setup display area 1306. This process corresponds to a step for displaying reconciliation information. The term "reconciliation information" corresponds to conflict information.

When the saving of the conflict information in S1610 is over, processing advances to the following step S1611. In S1611, it is determined whether the setting configured in the retrieval method specification section 1205 of FIG. 12 is to "Retrieve All Features" or to "Retrieve Selected Features Only". If the configured setting is "Retrieve All Features", then in S1612 all the page-level print attributes obtained by merging in S1608 are compared with the job-level print attributes extracted in S1602. Comparing the job-level and page-level print attributes makes it possible to determine whether the current FixedPage has exception settings.

On the other hand, if it is determined in S1611 that the configured setting is "Retrieve Selected Features Only", then in S1613 the features selected in the retrieval setup feature specification section 1206 are compared with the corresponding features contained in the job-level print attributes extracted in S1602. S1612 and S1613 correspond to an exception extracting step.

Next, in S1614, the results of comparisons conducted in S1612 or S1613 are used to determine whether the attribute values of the page-level print tickets (print tickets determined in S1607) and the job-level print ticket of the current pages of interest are different or not. If it is determined in S1614 that the values of the attributes are different, processing advances to S1615. In S1615, setup features determined to have different attribute values as a result of comparison conducted in S1612 or S1613 are extracted and exception settings are stored in exception setup information 1401 shown in FIG. 14.

The exception setup information 1401 contains an exception setup information tag 1402, a document number tag 1403, a page exception setup information tag 1404, an exception start page number tag 1405, an exception end page number tag 1406, and an exception setting content tag 1407. The exception setup information tag 1402 shows the entire exception setup information. The document number tag 1403 shows the number of the FixedDocument comprising the exception setup information. The page exception setup information tag 1404 shows page exception setup information. The exception start page number tag 1405 shows the starting page number of the page exceptions. The exception end page number tag 1406 shows the end page number of the page exceptions. The exception setting content tag 1407 shows the setup features of the page exceptions. For instance, referring to FixedPage2 of the XPS document of FIG. 19, the print ticket 1902 associated therewith has a different PageColor attribute and PageInputBin attribute in comparison with the job-level print ticket 1901. Thus, it is evident that this information is stored in the exception setting content tag 1407 in exception setup information 1401.

Next, in S1616, the page number of the current page, that is, the page of interest, is stored in the exception start page number tag 1405 of the exception setup information 1401. In S1617, the print ticket of the following FixedPage is acquired. In S1618, it is determined whether the acquired print ticket has the same print attributes as the print attributes of the print ticket of the previous FixedPage. In addition, the print ticket of the following FixedPage is read if it is determined that the print attributes are the same. The processing of S1617 and S1618 is repeated until the print attributes change or there are no subsequent FixedPages. Because in the exemplary XPS document of FIG. 19 the print ticket 1902 is associated with FixedPage2 and FixedPage3, it can be determined that FixedPage2 and FixedPage3 have the same print attributes. For this reason, the processing of S1617 and S1618 is carried out until the FixedPage4 is read in, with said page having associated therewith a print ticket 1903, which has print attributes different the print ticket 1902.

If it is determined in S1618 that there are no subsequent FixedPages, or that the print attributes are different from the print ticket of the previous FixedPage, processing advances to S1619. In S1619, the page number of the current FixedPage is stored in the exception end page number tag 1406 of the exception setup information 1401. When the exception settings of the print ticket 1902 of the XPS document of FIG. 19 are saved, the page number 3 is stored in the exception end page number tag 1406.

Next, in S1620, it is determined whether the print tickets of all the FixedPages in the FixedDocument have been read. If it is determined that the process is not over, processing advances to S1621 and, upon acquisition of the print ticked of the next FixedPage, processing branches to S1607. In this manner, processing from S1607 to S1620 is repeated until print tickets are tested for all the FixedPages in the FixedDocument. On the other hand, processing advances to S1622 when it is determined in S1620 that processing of all the FixedPages in the FixedDocument is over.

In S1622, it is determined whether processing of all the FixedDocuments in the FixedDocumentSequence is over or not. If it is determined that it is not over, processing branches to S1604, and the steps from S1604 to S1622 are repeated. On the other hand, if it is determined in S1622 that processing of all the FixedDocuments is over, processing advances to S1623 and the exception settings list 1110 of FIG. 11 is displayed in accordance with the contents of the exception setup information 1401. It is understood that the contents of the exception setup information 1401 is reflected in the special settings display section 1110 of FIG. 11.

In addition, in S1624, the contents of the job-level print ticket are reflected in the UI windows other than the special settings display section 1110, and processing is terminated. S1624 corresponds to an exception setting displaying step.

In this manner, exception setup information can be created based on the print tickets of an XPS document. Therefore, the user can easily understand exception settings. Moreover, the user can change the exception settings and the contents of the changes can be reflected in the print tickets.

[Flow of Print Attribute Saving in XPS Document in Present Invention]

Figure 17:
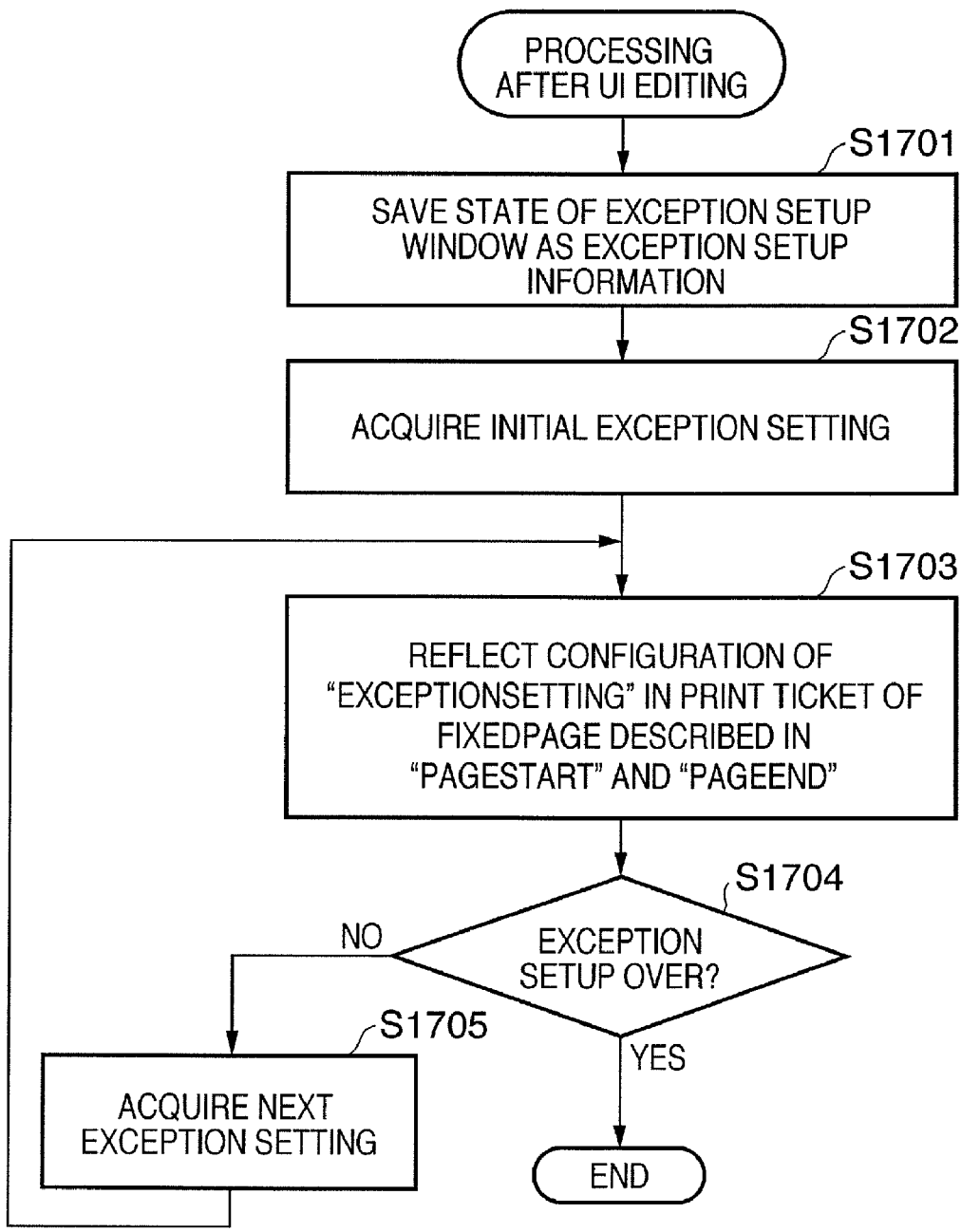
FIG. 17 is a flow diagram illustrating the saving of print attributes in an XPS document.
Figure 18:
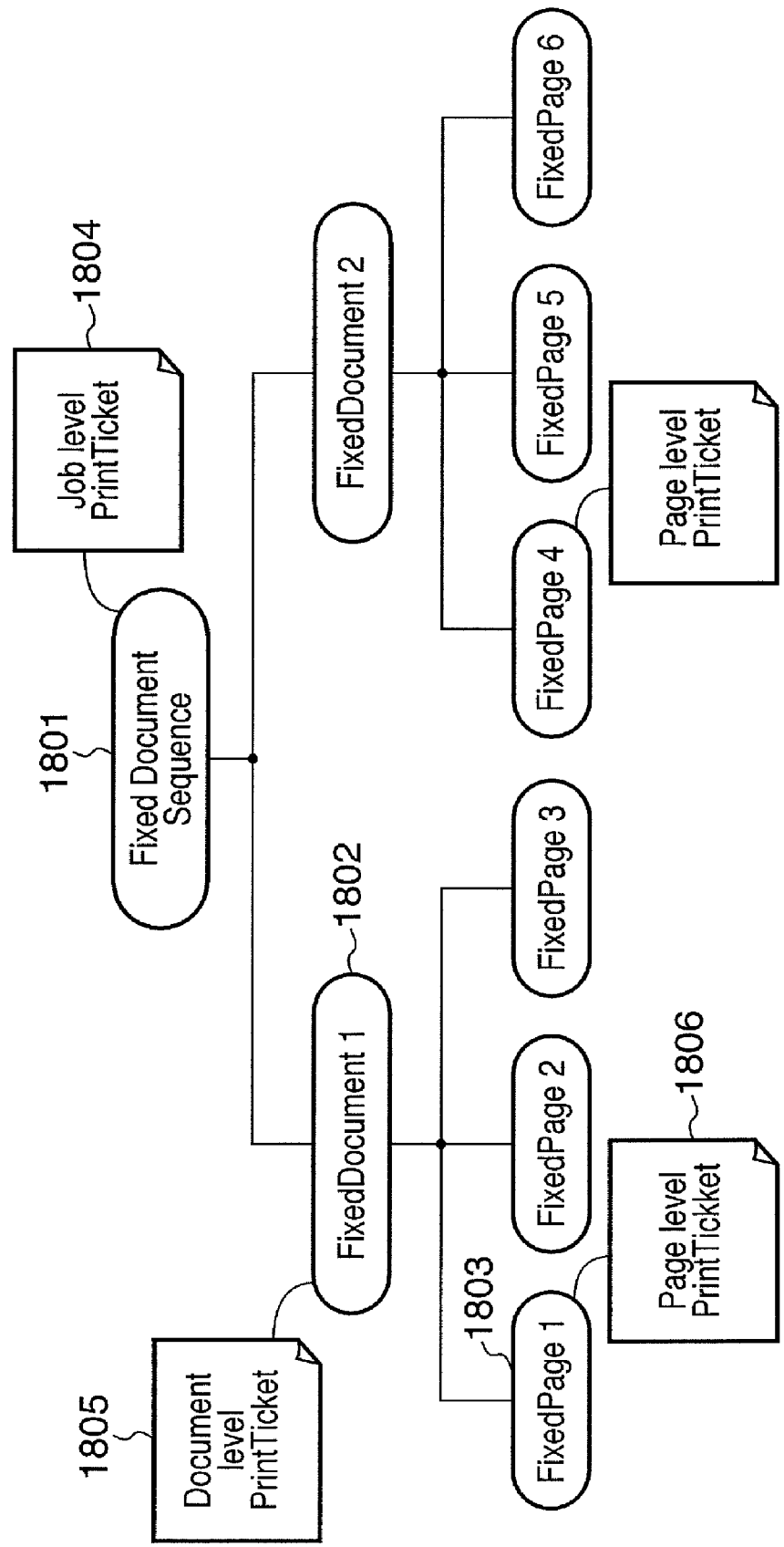
FIG. 18 is a block diagram of an XPS document.

FIG. 17 is a flow chart, in which, upon reconfiguration of print attributes in the UI setup windows of the user I/F driver 806, the print attributes are saved to the XPS document specified in the text box 1202 of FIG. 12. This process is carried out by the user I/F driver 806 when an OK button 1108 of FIG. 11 is pressed.

First of all, in S1701, the state of the exception setup window in the print setup window is saved in the format of the exception setup information 1401. The initial exception setup information tag 1402 of the exception setup information 1401 is acquired in S1702. In S1703, the contents of the exception setting content tag 1407 are saved in the print tickets associated with the FixedPages described in the exception start page number tag 1405 and exception end page number tag 1406. In other words, the reconfiguration of the print attributes is reflected in the XPS document.

Next, in S1704, it is determined whether all the page exception setup information of the exception setup information 1401 has been processed. If it is determined that processing of page exception setup information is not over, then, in S1705, exception setup information for the next page is acquired and the processing of S1703 to S1704 is repeated. On the other hand, processing is terminated if it is determined in S1704 that processing of all the page exception setup information in the exception setup information 1401 is over.

The above-described procedure makes it possible to modify print attributes and retrieve print tickets of the various hierarchical levels in the XPS document into the exception setup window.

As a result, the exception settings of the XPS document are presented to the user and can be changed.

In addition, as a result of that, the user can easily monitor print attributes for each page in the XPS document with the help of the printer driver, and, therefore, can prevent unintended print output.

Moreover, because the user can select the ranges and features used when retrieving print attributes contained in the XPS document, the contents of the print attributes can be efficiently displayed in the user interface.

In addition, because conflicts arising in case of invalid combinations of print attributes in the XPS document can be solved and the contents can be displayed, user can easily recognize reconciled settings.

It should be noted that, in the present embodiment, explanations have been provided regarding an XPS document as a document example. However, in case of document data permitting configuration of exception settings for pages and page ranges, the present invention can be applied to documents other than XPS.

Figure 20:
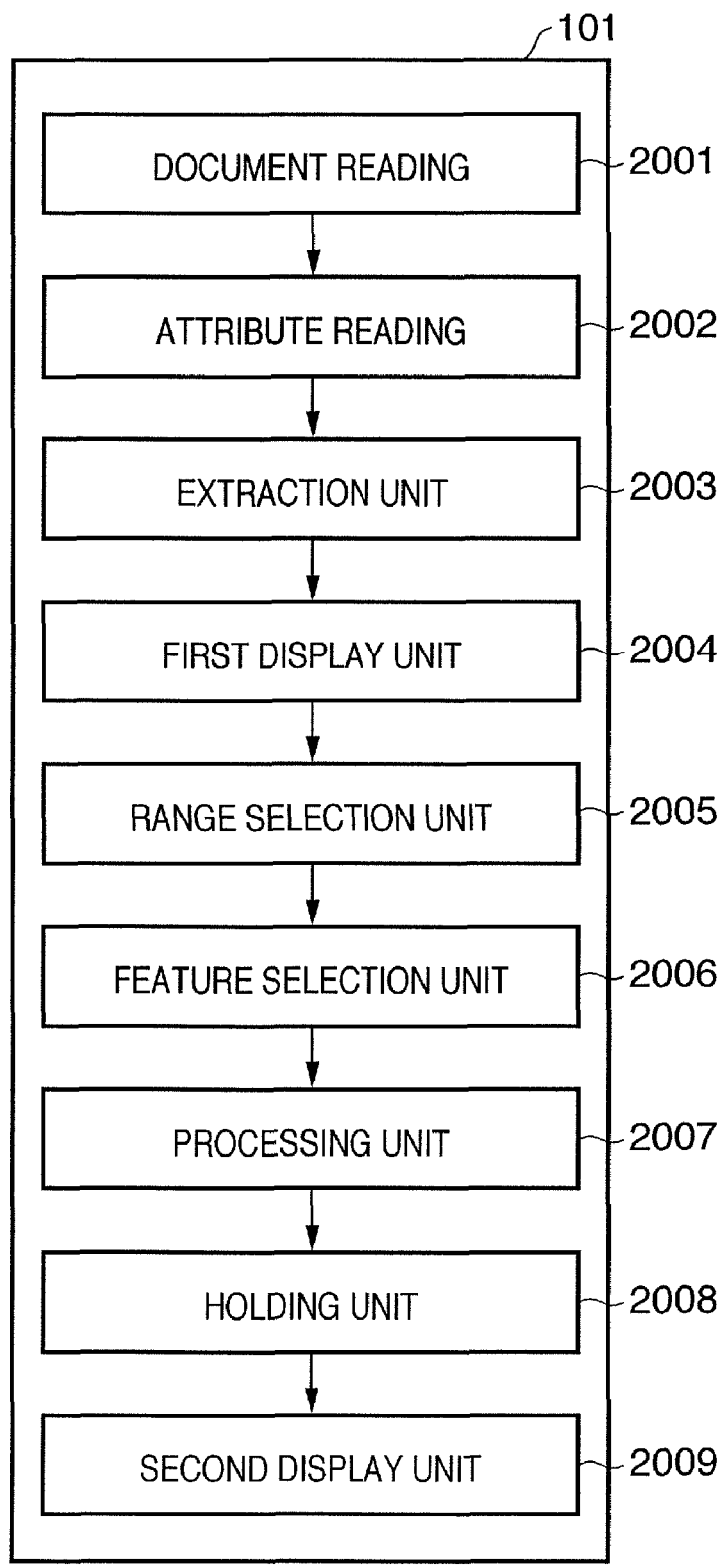
FIG. 20 is a block diagram of a client PC.

Here, explanations regarding a block diagram of the client PC 101 will be provided using FIG. 20.

The client PC 101 is a document processing apparatus, in which document data having a tree structure made up of a plurality of hierarchical levels and allowing print attributes to be associated with nodes at each hierarchical level can be operated upon by a printer driver used to handle the print attributes, permitting association of the print attributes with each node in each hierarchical level.

A document reading unit 2001 reads document data in accordance with read instructions entered through the user interface of the printer driver. Of course, the read instruction can be input in other ways, such as via a dialog window in a software application program.

An attribute reading unit 2002 reads print attributes associated with nodes in the document data read in by the document reading unit 2001.

An extraction unit 2003 extracts exception settings different from the print attributes associated with the document as a whole from among the print attributes read in by the attribute reading unit 2002.

A first display unit 2004 displays the exception settings extracted by the extraction unit 2003 in an exception setup window in the user interface of the printer driver.

Based on selection instructions entered through the user interface of the printer driver, a range selection unit 2005 obtains hierarchical options read in by the attribute reading unit 2002 from among the plurality of hierarchical structures of the document data.

Based on feature selection instructions entered through the user interface of the printer driver, a feature selection unit 2006 receives selections of print attribute features read in as exception settings among the print attribute features of various hierarchical levels of the document data.

A processing unit 2007 performs processing to reconcile attribute values so as to produce correct combinations of attributes when there are attribute features configured with incompatible values in the print attributes associated with the nodes of each hierarchical level read in by the attribute reading means.

A holding unit 2008 holds information on the attributes reconciled by the processing unit 2007.

A second display unit 2009 displays the reconciliation information held by the holding unit 2008.

It should be noted that the present invention may be applied to a system composed of a plurality of devices (e.g. a host computer, interface devices, readers, printers, etc.) and may also be applied to an apparatus constituted by a single device (e.g. a copy machine, a facsimile machine, etc.). Moreover, the object of the present invention is also achieved if a storage medium containing a record of program code implementing the functionality of the above-described embodiment is supplied to a system or apparatus and the computer of the system or apparatus reads and executes the program code stored on the storage medium. In such a case, the program code read from the storage medium implements the functionality of the above-described embodiment and therefore the program code itself and the storage medium, on which the program code is stored, form part of the present invention.

Namely, the present invention also includes cases, in which an OS (operating system) etc. running on a computer partially or entirely carries out actual processing based on the instructions of the program code and the functionality of the above-described embodiment is realized by this processing. Furthermore, the present invention is also applicable to cases, wherein the program code read from the storage medium is written to a memory provided on an expansion card inserted in the computer or an expansion unit connected to the computer. In such a case, based on the instructions of the program code written thereto, a CPU, etc. provided in the expansion unit or expansion card partially or entirely executes actual processing and the functionality of the above-described embodiment is implemented based on this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent No. 2006-208933, filed Jul. 31, 2006, which is hereby incorporated by reference herein in its entirety.

What is claimed is:

1. A document processing apparatus, in which document data having a tree structure made up of a plurality of hierarchical levels and allowing print attributes to be associated with nodes at each hierarchical level can be operated upon by a printer driver used to handle the print attributes, the apparatus comprising:
    a document reading unit configured to read the document data in accordance with a read instruction;
    an attribute reading unit configured to read print attributes associated with the nodes in the document data read by the document reading unit;
    an extracting unit configured to extract an exception setting different from the print attributes associated with the whole document from among the print attributes read by the attribute reading unit; and
    a first displaying unit configured to display the exception setting extracted by the extracting unit in the user interface of the printer driver.

2. The document processing apparatus according to claim 1, further comprising:
    a range selecting unit configured to select a hierarchical option read in by the attribute reading unit from among the plurality of hierarchical structures of the document data in accordance with a selection instruction entered through the user interface of the printer driver,
    wherein the attribute reading unit reads print attributes from the document data in accordance with a selected read range.

3. The document processing apparatus according to claim 1, further comprising:
    a feature selecting unit configured to select a print attribute feature option read in as an exception setting from among the print attribute features of the hierarchical levels of the document data in accordance with a feature selection instruction entered through the user interface of the printer driver,
    wherein the attribute reading unit reads print attributes from the document data for the print attribute feature selected by the attribute feature selecting unit.

4. The document processing apparatus according to claim 1, further comprising:
    a processing unit configured to reconcile attribute values to produce a correct combination of attributes when there are attribute features with incompatible setup values in the print attributes associated with the nodes of the hierarchical levels read in by the attribute reading unit;
    a holding unit configured to hold information on attributes reconciled by the processing unit; and wherein the displaying unit is configured to displaying the reconciliation information held by the holding unit.

5. A method for controlling a document processing apparatus, in which document data having a tree structure made up of a plurality of hierarchical levels and allowing print attributes to be associated with nodes at each hierarchical level can be operated upon by a printer driver used to handle the print attributes, the method comprising:

a document reading step, in which document reading unit reads the document data in accordance with a read instruction entered through a user interface;

an attribute reading step, in which attribute reading unit reads print attributes associated with the nodes in the document data read in the document reading step;

an extraction step, in which extracting unit extracts an exception setting different from the print attributes associated with the whole document from among the print attributes read in the attribute reading step; and a first displaying step, in which first displaying unit displays the exception setting extracted in the extraction step in the user interface of the printer driver.

6. The method according to claim 5, further comprising:

a range selection step of selecting a hierarchical option read in the attribute reading step from among the plurality of hierarchical structures of the document data in accordance with a selection instruction entered through the user interface of the printer driver, wherein in the attribute reading step, print attributes are read from the document data in accordance with a read range obtained in the range selection step.

7. The method according to claim 5, further comprising:

a feature selection step of selecting a print attribute feature option read in as an exception setting from among the print attribute features of the hierarchical levels of the document data in accordance with a feature selection instruction entered through the user interface, wherein in the attribute reading step, print attributes are read from the document data for the selected print attribute feature.

8. The method according to claim 5, further comprising:

a processing step of reconciling attribute values to produce a correct combination of attributes when there are attribute features with incompatible setup values in the print attributes associated with the nodes of the hierarchical levels read in the attribute reading step;

a holding step of holding information on attributes reconciled in the processing step; and a second displaying step of displaying the reconciliation information being held.

9. A non transitory computer readable storage medium storing a program for making a computer execute a method for controlling a document processing apparatus, in which document data having a tree structure made up of a plurality of hierarchical levels and allowing print attributes to be associated with nodes at each hierarchical level can be operated upon by a printer driver used to handle the print attributes, the method comprising:

a document reading step, in which document reading unit reads the document data in accordance with a read instruction entered through a user interface;

an attribute reading step, in which attribute reading unit reads print attributes associated with the nodes in the document data read in the document reading step;

an extraction step, in which extracting unit extracts an exception setting different from the print attributes associated with the whole document from among the print attributes read in the attribute reading step; and a first displaying step, in which first displaying unit displays the exception setting extracted in the extraction step in the user interface of the printer driver.

10. A document processing apparatus has a printer driver, the apparatus comprising:

a document reading unit configured to read document data in accordance with a read instruction entered through a user interface of the printer driver;

an attribute reading unit configured to read print attributes set the document data read by the document reading unit;

an extracting unit configured to extract an exception setting different from the print attributes associated with the whole document from among the print attributes read by the attribute reading unit; and a first displaying unit configured to display the exception setting extracted by the extracting unit in the user interface of the printer driver.

11. A method for controlling a document processing apparatus has a printer driver, the method comprising:

a document reading step, in which document reading unit reads document data in accordance with a read instruction entered through a user interface of the printer driver;

an attribute reading step, in which attribute reading unit reads print attributes set the document data read by the document reading unit;

an extraction step, in which extracting unit extracts an exception setting different from the print attributes associated with the whole document from among the print attributes read by the attribute reading unit; and a first displaying step, in which first displaying unit displays the exception setting extracted by the extracting unit in the user interface of the printer driver.

12. A non transitory computer readable storage medium storing a program for making a computer execute a method for controlling a document processing apparatus has a printer driver, the method comprising:

a document reading step, in which document reading unit reads document data in accordance with a read instruction entered through a user interface of the printer driver;

an attribute reading step, in which attribute reading unit reads print attributes set the document data read by the document reading unit;

an extraction step, in which extracting unit extracts an exception setting different from the print attributes associated with the whole document from among the print attributes read by the attribute reading unit; and a first displaying step, in which first displaying unit displays the exception setting extracted by the extracting unit in the user interface of the printer driver.

* * * * *